United States Patent
Ashihara et al.

(10) Patent No.: US 12,486,368 B2
(45) Date of Patent: Dec. 2, 2025

(54) POLYESTER FILM AND METHOD FOR PRODUCING SAME

(71) Applicant: UNITIKA LTD., Osaka (JP)

(72) Inventors: Hiroshi Ashihara, Kyoto (JP); Takayoshi Okuzu, Tokyo (JP); Ken Akamatsu, Kyoto (JP); Akiko Kurosawa, Kyoto (JP); Goro Araki, Kyoto (JP); Akito Kajita, Kyoto (JP)

(73) Assignee: UNITIKA LTD., Osaka (JP)

(*) Notice: Subject to any disclaimer, the term of this patent is extended or adjusted under 35 U.S.C. 154(b) by 0 days.

(21) Appl. No.: 17/619,613

(22) PCT Filed: Mar. 8, 2021

(86) PCT No.: PCT/JP2021/009015
§ 371 (c)(1),
(2) Date: May 3, 2023

(87) PCT Pub. No.: WO2021/182402
PCT Pub. Date: Sep. 16, 2021

(65) Prior Publication Data
US 2024/0018316 A1    Jan. 18, 2024

(30) Foreign Application Priority Data
Mar. 10, 2020 (JP) ................. 2020-040388

(51) Int. Cl.
*C08J 5/18* (2006.01)
*B29C 48/00* (2019.01)
(Continued)

(52) U.S. Cl.
CPC .............. *C08J 5/18* (2013.01); *B29C 48/0018* (2019.02); *B29C 48/022* (2019.02); *B29C 48/08* (2019.02);
(Continued)

(58) Field of Classification Search
CPC .......... C08J 5/18; B29C 48/022; B29C 48/08; B29C 48/0018; B29C 48/002;
(Continued)

(56) References Cited

U.S. PATENT DOCUMENTS

2015/0183204 A1* 7/2015 Nanjo .................... B32B 15/20
                                                         428/354
2018/0272594 A1* 9/2018 Akamatsu .......... B29C 48/0018
(Continued)

FOREIGN PATENT DOCUMENTS

CN    104411751    3/2015
CN    109562600    4/2019
(Continued)

OTHER PUBLICATIONS

Machine translation of JP 2003002987 by Sakakura et al. (Year: 2003).*

(Continued)

*Primary Examiner* — Christina H. W. Rosebach
(74) *Attorney, Agent, or Firm* — Csaba Henter; MILLEN, WHITE, ZELANO & BRANIGAN

(57) ABSTRACT

A polyester film includes a polyester (A) composed mainly of polybutylene terephthalate and a polyester (B) composed mainly of polyethylene terephthalate, wherein a mass ratio (A/B) between the polyesters (A) and (B) is 70/30 to 55/45, a dry heat shrinkage rate (B) through heat treatment at 200° C. for 15 minutes is 35% or less in any of four directions (0°, 45° 90° and 135°) on the film surface, a difference between a maximum value and a minimum value of these dry heat shrinkage rates is 5% or less, a thickness variation in the four directions is 10% or less, and a crystallization index shown in DSC measurement is 25 to 55 J/g.

14 Claims, 1 Drawing Sheet

(51) Int. Cl.
  *B29C 48/08* (2019.01)
  *C08G 63/183* (2006.01)
  *B29K 67/00* (2006.01)
  *B29L 31/00* (2006.01)

(52) U.S. Cl.
  CPC ...... *C08G 63/183* (2013.01); *B29K 2067/003* (2013.01); *B29K 2067/006* (2013.01); *B29K 2995/0049* (2013.01); *B29K 2995/0053* (2013.01); *B29K 2995/0097* (2013.01); *B29L 2031/717* (2013.01)

(58) Field of Classification Search
  CPC ............ C08G 63/183; B29K 2067/003; B29K 2067/006; B29K 2995/0049; B29K 2995/0053; B29K 2995/0097; B29L 2031/717
  See application file for complete search history.

(56) References Cited

U.S. PATENT DOCUMENTS

| | | | |
|---|---|---|---|
| 2019/0184681 A1* | 6/2019 | Iyo | ............................ B32B 15/09 |
| 2019/0184692 A1 | 6/2019 | Fujii et al. | |
| 2020/0156359 A1* | 5/2020 | Goto | ........................ B32B 27/26 |
| 2020/0172725 A1 | 6/2020 | Tamari et al. | |
| 2021/0179843 A1 | 6/2021 | Okuzu et al. | |
| 2021/0198477 A1 | 7/2021 | Goto et al. | |

FOREIGN PATENT DOCUMENTS

| | | |
|---|---|---|
| JP | 61-209128 | 9/1986 |
| JP | 3247053 | 11/2001 |
| JP | 2002-220482 | 8/2002 |
| JP | 2003-2987 | 1/2003 |
| JP | 2005-153319 | 6/2005 |
| JP | 2005-238735 | 9/2005 |
| JP | 3753592 | 12/2005 |
| JP | 2006-160999 | 6/2006 |
| JP | 2015-131888 | 7/2015 |
| JP | 2017-66405 | 4/2017 |
| JP | 2020-41054 | 3/2020 |
| JP | 2020-41122 | 3/2020 |
| TW | 201905049 | 2/2019 |
| WO | 2017/057773 | 4/2017 |
| WO | 2017/126563 | 7/2017 |
| WO | WO-2019021759 A1 * | 1/2019 ............. B32B 15/08 |

OTHER PUBLICATIONS

Machine translation of JP 2000143840 by Fujita et al. (Year: 2000).*
Decision of Approval dated Jun. 22, 2022 in corresponding Taiwanese patent application No. 110108544 and English translation.
Chinese Office Action dated Sep. 7, 2022 in corresponding Chinese Patent Application No. 202180006796.X and English translation.
English machine translation of JP 2006-160999.
International Search Report in corresponding PCT application No. PCT/JP2021/009015, dated May 18, 2021.
Decision to Grant a Patent in corresponding Japanese Patent Application No. 2021-529687, dated Jul. 7, 2021, and English translation.
English machine translation of JP 3247053.
English machine translation of JP 3753592.
English machine translation of JP 2005-238735.
English machine translation of JP 2005-153319.
English machine translation of JP 2003-2987.
English machine translation of JP 2002-220482.
English machine translation of JP 2020-41054.
English machine translation of JP 2015-131888.

* cited by examiner

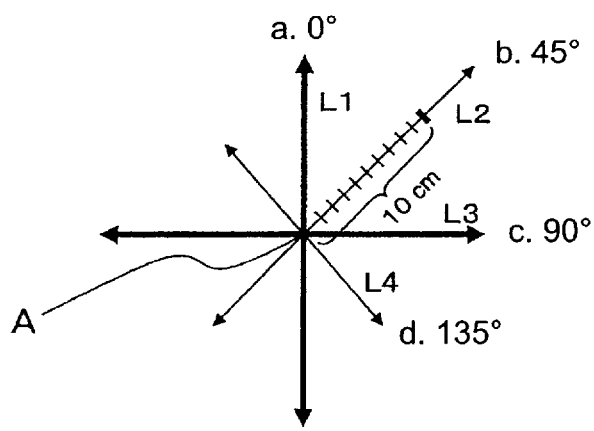

POLYESTER FILM AND METHOD FOR PRODUCING SAME

TECHNICAL FIELD

The present invention relates to a polyester film containing a polybutylene terephthalate-based resin and a polyethylene terephthalate-based resin, and a method for producing the same.

BACKGROUND ART

Conventionally, a solvent-type coating material composed mainly of thermosetting resin has been applied to the inner and outer surfaces of a metal can for the purpose of preventing corrosion. However, the solvent-type coating material requires heating at high temperature in order to form a coating film, and a large amount of a solvent is generated at that time, causing problems in terms of work safety and the environment. Accordingly, as a method for preventing corrosion without use of solvent, covering of a metal plate with a thermoplastic resin has been recently proposed. Among the thermoplastic resins, polyesters are particularly excellent in processability, heat resistance, etc., so that development of polyesters covering a metal plate is ongoing.

Examples of the method for covering a metal plate with a thermoplastic resin include a method including melting the thermoplastic resin to be directly extruded onto the metal plate, and a method including thermally press-bonding a thermoplastic resin film to the metal plate directly or through an adhesive. Among the methods, a method using a thermoplastic resin film is considered to be an effective method, due to excellence in workability with easiness in handling of the resin, and excellence in the thickness uniformity of the resin film. Also, since the method using an adhesive has environment and cost problems, a method including directly thermally press-bonding a film is advantageous and attracts attention.

Metal cans covered with a thermoplastic resin film are manufactured by forming and processing a laminated metal plate composed of a thermoplastic resin film laminated on a metal plate such as a steel plate or an aluminum plate (including ones subjected to surface treatment such as plating). The thermoplastic resin film used in such application is required to have good thermal lamination properties with the metal plate, and also have excellent can formability, that is, having no occurrence of peeling, cracks, pinholes of the film during formation of the can. Further, the outer film of the can after formation is required to be excellent in printability and transparency. Also, during retort sterilization and long-term storage, the inner film of the can is required not to cause decrease in adhesiveness to the inner surface of the metal can, and not to cause degradation of performance for covering the inner surface of the metal can, so that the excellent taste and flavor retention properties can be achieved without contact between the contents in the can and the metal of the can.

In the production of such a polyester film al plate lamination, for the purpose of imparting thermal lamination properties and improving the can formability, several methods including mixing other components with a polyester, and copolymerizing polyesters have been proposed. The present inventors have previously proposed a biaxially stretched film made of 90 to 45 mass % of polybutylene terephthalate (PBT) or a polyester (A) composed mainly of the same, and 10 to 55 mass % of polyethylene terephthalate (PET) or a polyester (B) composed mainly of the same (Patent Literatures 1 and 2). The laminated metal plate obtained by thermal lamination of the film proposed therein on a metal plate has excellent processability. Further, the film does not become brittle even after retort sterilization and storage for a long time.

Examples of the method for thermally laminating a polyester film on a metal plate, a method including press-bonding a metal plate preheated to 160 to 250° C. in advance to a film with a roll to produce a thermally press-bonded laminate, and then cooling the laminate to room temperature.

In recent years, for the purpose of increasing the capacity of a can and improving the productivity, the speed of can-making has been enhanced and the size of a thermal lamination machine has been increased. For example, along with the enhancement of the speed of can-making, higher thermal lamination temperature is required in some cases. On the other hand, lower thermal lamination temperature is required in some cases for the purpose of reducing energy costs.

However, since the temperature range in which a polyester film can be thermally laminated on a metal plate is narrow, when the thermal lamination temperature is too high or too low, the resulting laminated metal plate has an insufficient adhesiveness between the polyester film and the metal plate in some cases, and after retort sterilization treatment and long-term storage, the film adhesiveness and covering properties are degraded in some cases.

Also, a stretched film suitable for being attached to a metal foil for cold-molding is disclosed in Patent Literature 3.

The stretched film disclosed in Patent Literature 3, however, lacks physical properties necessary for preventing corrosion of the inner and outer surfaces of a metal can in some cases, due to a large dry heat shrinkage rate when exposed to a high temperature of about 200° C., with a poor balance of dry heat shrinkage rate in each direction.

Accordingly, a polyester film used on the inner and outer surfaces of a metal can is required to enable thermal lamination in a wide temperature range from relatively low temperature to high temperature, such that a laminated metal plate having excellent adhesiveness between a metal plate and the film can be obtained, and to have the following performance properties: excellent formability and processability into a can (can-making properties), excellent transparency after can-making, and being capable of retaining excellent adhesiveness and covering properties even after retort sterilization and long-term storage.

CITATION LIST

Patent Literature

[Patent Literature 1] Japanese Patent No. 3247053
[Patent Literature 2] Japanese Patent No. 3753592
[Patent Literature 3] International Publication No. WO 2017/057773

SUMMARY OF INVENTION

Technical Problem

In order to solve the problem, an object of the present invention is to provide a polyester film which enables thermal lamination treatment with a metal plate in a wide temperature range, and has excellent adhesiveness to a metal plate, excellent formability and processability into a can (can-making properties), excellent transparency after can-making, excellent adhesiveness and covering properties to a metal plate even after retort sterilization and long-term storage, and excellent taste and flavor retention properties of a can content.

Solution to Problem

Through extensive study to solve the problem, the present inventors have found that a polyester film obtained by stretching an unstretched sheet containing two or more polyesters with different crystallinity, i.e., a polyester (A) composed mainly of polybutylene terephthalate and a polyester (B) composed mainly of polyethylene terephthalate with a specified ratio, by a specified method with a specified magnification can be subjected to thermal lamination treatment with a metal plate in a wide range of temperature, and has excellent adhesiveness to a metal plate and has excellent formability and processability into a can (can-making properties), excellent transparency after can-making, and excellent adhesiveness and covering properties to a metal plate even after retort sterilization and long-term storage, so that the present invention has been achieved.

In other words, the summary of the present invention is as follows.

A polyester film of the present invention includes a polyester (A) composed mainly of polybutylene terephthalate and a polyester (B) composed mainly of polyethylene terephthalate,
wherein a mass ratio (A/B) between the polyesters (A) and (B) is 70/30 to 55/45,
a dry heat shrinkage rate (B) through heat treatment at 200° C. for 15 minutes is 358 or less in any of four directions on a film surface consisting of a 0° direction as an arbitrary direction, and a 45° direction, a 90° direction and a 135° direction clockwise from the 0° direction, and a difference between a maximum value and a minimum value of these dry heat shrinkage rates is 5% or less,
a thickness variation calculated from the following equation in the four directions is 10% or less:

Thickness variation (%)=$(T_{max}-T_{min})/T_{ave} \times 100$ $T_{max}$: maximum thickness in four directions of polyester film
$T_{min}$: minimum thickness in four directions of polyester film
$T_{ave}$: average thickness in four directions of polyester film,
and a crystallization index shown in DSC measurement is 25 to 55 J/g.

It is preferable that the polyester film according to the present invention have melting points in the range of 200 to 223° C. and in the range of 225 to 256° C.

It is preferable that the polyester film according to the present invention have a dry heat shrinkage rate (B) through heat treatment at 200° C. for 15 minutes of 5% or more in any of four directions on a film surface consisting of a 0° direction as an arbitrary direction, and a 45° direction, a 90° direction and a 135° direction clockwise from the 0° direction.

It is preferable that the polyester film according to the present invention have a dry heat shrinkage rate (A) through heat treatment at 160° C. for 30 minutes of 3 to 20% in any of four directions on a film surface consisting of a 0° direction as an arbitrary direction, and a 45° direction, a 90° direction and a 135° direction clockwise from the 0° direction.

A method for producing a polyester film of the present invention is a method for producing the polyester film including a stretching step of stretching an unstretched sheet in a flow direction of the sheet (MD stretching) and then stretching the same in a width direction (TD stretching),
wherein the MD stretching is performed in two or more stages such that the MD stretching magnification (X) represented by a product of stretching magnifications in the respective stages in the MD stretching and the TD stretching magnification (Y) satisfy the following conditions:
a stretching magnification ratio (X/Y) of 0.82 to 1.10, and
an area magnification (X×Y) of 12.00 to 16.00.

According to the method for producing a polyester film of the present invention, it is preferable that in MD stretching, the stretching magnification ($X_{n+1}$) in a (n+1)-th stage be higher than the stretching magnification ($X_n$) in an n-th stage.

According to the method for producing a polyester film of the present invention, it is preferable that at the temperature during extrusion into an unstretched sheet, the polyester (A) and the polyester (B) for use have a difference in melt viscosity of 65 Pa·s or less.

A polyester film for lamination on a metal plate of the present invention includes the polyester film described above for use in lamination on a metal plate.

A polyester film for lamination on a metal can of the present invention includes the polyester film described above for use in lamination on a metal can.

It is preferable that the polyester film for lamination on a metal can according to the present invention be used for lamination on an inner surface of the metal can.

It is preferable that the polyester film for lamination on a metal can according to the present invention be used for lamination on an outer surface of the metal can.

The laminated metal plate of the present invention includes the polyester film for lamination on a metal plate described above laminated on the metal plate.

A metal container of the present invention is obtained by forming the laminated metal plate described above.

Advantageous Effects of Invention

A polyester film of the present invention includes two polyester resins blended at a specified ratio, having excellent uniformity of the dry heat shrinkage rate in four directions at 0°, 45°, 90° and 135° with excellent thickness uniformity. Because of this, even when the temperature range in thermal lamination with a metal plate is wide from relatively low temperature to relatively high temperature, the polyester film of the present invention has excellent adhesiveness to the metal plate, excellent formability and processability into a can (can-making properties), and excellent transparency after formation of the can, and retain excellent adhesiveness and covering properties to the metal plate even after retort sterilization treatment and long-term storage. The polyester film of the present invention can be suitably used as an outer film of a metal can due to having excellent transparency after can-making, and can be suitably used as an inner film of a metal can due to having excellent covering properties to a metal can even after retort sterilization and long-term storage, and excellent taste and flavor retention properties of a can content.

BRIEF DESCRIPTION OF THE DRAWINGS

FIG. 1 is a chart showing a method for measuring thickness variation of a polyester film.

DESCRIPTION OF EMBODIMENTS

Hereinafter, the present invention is described in detail.

The polyester film of the present invention is a polyester film including a polyester (A) composed mainly of polybutylene terephthalate and a polyester (B) composed mainly of polyethylene terephthalate, wherein the mass ratio (A/B) between the polyesters (A) and (B) is required to be 70/30 to 55/45.

The polyester (A) composed mainly of polybutylene terephthalate of the present invention may not be limited to a homopolybutylene terephthalate composed of butylene terephthalate units only but may be a copolymer containing 80 mol % or more, particularly 90 mol % or more, or still more particularly 95 mol % or more of butylene terephthalate units. In the present invention, the polyester (A) is preferably a copolymer containing 90 mol % or more of butylene terephthalate units, particularly preferably a homopolybutylene terephthalate. With a content of butylene terephthalate units of less than 80 mol %, the polyester (A) has a reduced crystallization rate. The resulting film has a reduced crystallization index and tends to have reduced adhesiveness and degraded barrier properties after retort treatment.

The copolymerization component of the polyester (A) is not particularly limited, and examples of an acid component include a dicarboxylic acid such as isophthalic, acid, phthalic acid, 2,6-naphthalene dicarboxylic acid, 5-sodium sulfoisophthalic acid, oxalic acid, succinic acid, adipic acid, sebacic acid, azelaic acid, dodecanedioic acid, dimer acid, maleic anhydride, maleic acid, fumaric acid, itaconic acid, citraconic acid, mesaconic acid, and cyclohexane dicarboxylic acid, 4-hydroxybenzoic acid, ε-caprolactone, and lactic acid.

Also, examples of an alcohol component include ethylene glycol, diethylene glycol, 1,3-propanediol, neopentyl glycol, 1,6-hexanediol, cyclohexane dimethanol, triethylene glycol, polyethylene glycol, polypropylene glycol, polytetramethylene glycol, an ethylene oxide adduct of bisphenol A and bisphenol S.

Further, a small amount of a trifunctional compound such as trimellitic acid, trimesic acid, pyromellitic acid, trimethylol propane, glycerol, and pentaerythritol may be used.

Two or more of these copolymerization components may be used in combination.

From the viewpoint of the heat resistance of the film, the polyester film of the present invention has a melting point derived from the polyester (A) preferably in the range of 200 to 223° C. With a melting point of less than 200° C., the film has reduced heat resistance.

The polyester (B) composed mainly of polyethylene terephthalate of the present invention may be a homopolyethylene terephthalate resin composed of ethylene terephthalate units only, or a copolymer containing ethylene terephthalate units. The copolymer contains preferably 80 mol % or more, and in particular, more preferably 85 to 98 mol %, of ethylene terephthalate units. From the viewpoint of cost reduction such as heat reduction in a can-making process and thinning of a metal plate to be laminated, it is preferable that the polyester (B) be a copolymer.

As copolymerization components of the polyester (B), both of an acid component and an alcohol component for use may be the same components as in the case of the polyester (A). In particular, it is preferable that the polyester (B) contain isophthalic acid as an acid component. The content of isophthalic acid in the acid components is preferably 2 to 15 mol %, more preferably 3 to 10 mol %, in particular, and most preferably 4 to 7 mol %.

The polyethylene terephthalate copolymerized with isophthalic acid in the range has an enlarged temperature range for thermal lamination and tends to have improved adhesiveness to a metal plate. While the resulting polyester film tends to have an enlarged thickness variation, the thickness variation can be improved by the production method of the present invention described below (method in which an MD stretching step is performed by two or more multi-stage stretching) so as to obtain excellent adhesiveness and covering properties to a metal plate.

The polyethylene terephthalate copolymerized with isophthalic acid may be used alone or may be mixed with a homopolyethylene terephthalate resin for use. In the case of mixing with homopolyethylene terephthalate, the content of homopolyethylene terephthalate relative to the whole polyester (B) is preferably 70 mol % or less, more preferably 50 mol % or less, from the viewpoint of cost reduction such as heat reduction in a can-making process and thinning of a metal plate to be laminated.

The polyester film of the present invention has melting point derived from the polyester (B) preferably in the range of 225 to 256° C., more preferably in the range of 230 to 256° C., still more preferably in the range of 235 to 256° C. With a polyester (B) having a melting point of less than 225° C., the resulting film tends to cause whitening or generation of white spots after retort treatment, with reduction in adhesiveness after retort treatment. In particular, with a polyester (B) having a melting point of 225° C. or more, the film has improved heat resistance and adhesiveness after retort treatment and long-term storage, and troubles such as fusion bonding to a jig during processing of a can and fracture in the middle of processing of a can body are effectively reduced.

Both of the polyester (A) and the polyester (B) may contain any or a plurality of a component derived from biomass, a chemically recycled resin component polymerized from a starting material such as a recycled monomer or a recycled oligomer obtained by depolymerization of resin waste material or the like, and a recycled material component obtained by pulverizing trimmed lug waste, slit waste, etc., generated in film production, or obtained by melting and pelletizing the waste or a film as defective product once again.

In the polyester film of the present invention, the mass ratio (A/B) between the polyester (A) and the polyester (B) is required to be 70/30 to 55/45, and in order to obtain sufficient effects of the present invention, the ratio is preferably 67/33 to 58/42, more preferably 63/37 to 60/40.

With a proportion of the polyester (A) in the total mass of the polyester (A) and the polyester (B) of more than 70 mas the resulting film has reduced adhesiveness after retort treatment. On the other hand, with a proportion of the polyester (B) of more than 45%, due to the increased proportion of the component having a high melting point in a film, the adhesiveness between the film and a metal plate is reduced in lamination processing of the metal plate at low temperature, and the adhesiveness is also reduced after retort treatment.

In particular, with a proportion of the polyester (A) in the range of 70 to 55 mass %, the laminated metal plate has excellent forming and processability conformability in high-speed high-order drawing and ironing, and the film causes no whitening phenomenon and micro cracks resulting from a void generated by excessive deformation, having excellent adhesiveness to a metal plate, with the adhesiveness and covering properties to the metal plate being good even through long-term storage after retort treatment. As a result, in a can having the film on the inner surface, the metal plate is covered even after long-term storage, so that the can has excellent corrosion resistance (protection of the contents, taste and aroma preservation, and flavor retention). Further, a can having the film on the outer surface generates no rust and has a high glossiness of printed design, so that a product with high commodity value can be obtained. The film on the outer surface has transparency to an extent that does not impair the design of the can itself.

The polyester film of the present invention is required to satisfy the following conditions (1) to (3) at the same time so as to enable the thermal lamination treatment with a metal plate in a wide temperature range.

(1) The dry heat shrinkage rate (B) through heat treatment at 200° C. for 15 minutes is required to be 35% or less, preferably 33% or less, and more preferably 30% or less, in any of four directions (0°, 45°, 90° and 135°) on a film surface. On the other hand, the dry heat shrinkage rate (B) is preferably 5% or more, more preferably 7% or more, and still more preferably 10% or more. The range of the dry heat shrinkage rate (B) is preferably 5 to 35%, more preferably 7 to 35%, still more preferably 10 to 33%, and most preferably 15 to 30%.

With a dry heat shrinkage rate (B) of more than 35%, the film may have reduced impact resistance and degraded barrier properties after retort treatment, taste and flavor retention properties, and flavor properties. These are caused due to a too small crystallization index of the film.

On the other hand, with a dry heat shrinkage rate (B) of less than 5%, the thermal lamination properties with a metal plate may be reduced. This is caused by a too large crystallization index of the film.

Also, the difference between the maximum value and the minimum value of these dry heat shrinkage rates (B) is required to be 5% or less, preferably 4% or less, more preferably 3% or less.

(2) The thickness variation calculated from the following equation is required to be 10% or less in the four directions, preferably 8% or less, more preferably 7% or less.

$$\text{Thickness variation (\%)} = (T_{max} - T_{min})/T_{ave} \times 100$$

$T_{max}$: maximum thickness in four directions of polyester film $T_{min}$: minimum thickness in four directions of polyester film $T_{ave}$: average thickness in four directions of polyester film.

(3) The crystallization index shown by DSC measurement is required to be 25 to 55 J/g.

In the present invention, the crystallization index means a difference between heat of melting ΔHm and heat of crystallization during heating ΔHc (ΔHm−ΔHc) when the film is heated from 20° C. to 280° C. at 20° C./min in DSC measurement.

With a focus on the thermal lamination properties to a metal can, it is preferable that the film have a smaller crystallization index. However, in order to have an impact resistance, barrier properties after retort treatment, taste and flavor retention properties and flavor properties as minimum requirements for a film for lamination on a metal can, it is also important that the film has a certain level of crystallization index.

The film of the present invention is required to have a crystallization index of 25 to 55 J/g, preferably 30 to 50 J/g, and more preferably 35 to 45 J/g.

The film having a crystallization index of less than 25 J/g has reduced impact resistance and degraded barrier properties after retort treatment, taste and flavor retention properties and flavor properties. The film having a crystallization index of more than 55 J/g tends to have degraded thermal lamination properties to a metal plate.

The film having a crystallization index in the range can endure harsh processing such as thermally press-bonding to a metal plate and drawing with ironing, while maintaining the impact resistance, barrier properties after retort treatment, taste and flavor retention properties and flavor properties.

Examples of the method for adjusting the crystallization index of a film in the range include a method in which the mass ratio between the polyester (A) and the polyester (B) is adjusted in a specified range and the MD stretching of the film is performed in two or more stages.

Unless the conditions (1) to (3) are satisfied at the same time, the film of the resulting laminated metal plate may have insufficient adhesiveness and covering properties to a metal plate depending on the temperature during thermal lamination, and adhesiveness to the metal plate may be reduced after retort treatment and long-term storage. Further, the laminated metal plate may have reduced formability into a can.

Incidentally, the four directions on a film surface refer to a 0° direction as an arbitrary direction, and 45°, 90° and 135° directions clockwise from the 0° direction. In particular, it is preferable that the flow direction of the film (MD) be 0°.

The dry heat shrinkage rate (A) through heat treatment at 160° C. for 30 minutes in any of four directions (0°, 45°, 90° and 135°) on a film surface is preferably 3 to 20%, more preferably 4 to 20%, still more preferably 5 to 18%, and most preferably 10 to 16%. With a too small dry heat shrinkage rate (A), the film may have degraded thermal lamination properties to a metal plate. This is caused by a too large crystallization index of the film. It is therefore preferable that a film used for lamination on a metal plate have a certain level of dry heat shrinkage rate. With a film having a dry heat shrinkage rate (A) of less than 3%, the thermal lamination properties to a metal plate may deteriorate. On the other hand, with a dry heat shrinkage rate (A) of more than 20%, impact resistance, barrier properties after retort treatment, taste and flavor retention properties and flavor properties may be degraded. These are caused by a too small crystallization index of the film.

Further, a difference between a maximum value and a minimum value of these dry heat shrinkage rates (A) is preferably 5% or less, more preferably 4% or less, and still more preferably 3% or less.

The thickness of the polyester film of the present invention is not particularly limited, preferably 5 to 50 μm, more preferably 10 to 30 μm.

It is preferable that the layer structure of the polyester film of the present invention be a multi-layer structure rather than a single-layer structure such that an additive having a bad effect in a film-making process and a thermal lamination step when present on the film surface, for example, a low-molecular weight polymer described below, is confined in the internal part of the film.

An unstretched sheet for producing a polyester film having a multi-layer structure may be obtained as a sheet-like molding formed of multi-layered sheets by using, for example, generally used multi-layer device, such as a multi-layer feed block, a static mixer, or a multi-layer multi-manifold.

In the film obtained from the unstretched sheet having a multi-layer structure, the cohesive force in the thickness direction decreases as the number of layers increases. As a result, in lamination processing at high temperature in particular, the thermally press-bonding to a metal plate and adhesiveness at later time decrease, so that delamination tends to Occur. Accordingly, the number of layers constituting the multi-layer structure is preferably small, more preferably 9 or less, still more preferably 5 or less, and most preferably 3 to 5.

Subsequently, the method for producing a polyester film of the present invention is described.

Regarding the raw material polyesters for use in producing the film of the present invention, the polyester (A) has an intrinsic viscosity (IV) of preferably 0.75 to 1.6 dl/g, the polyester (B) has an intrinsic viscosity of preferably 0.65 to 1.0 dl/g, and after mixing and melting, the intrinsic viscosity is preferably 0.75 to 1.2 dl/g.

With an intrinsic viscosity of the polyesters less than the range, the film fractures during high-order processing of a laminated metal plate, so that the productivity is extremely reduced. In particular, in the step of drawing and ironing a laminated metal plate in production of a can having a large capacity, the film cannot follow the large deformation processing, so that voids and cracks generate. As a result, even a small impact from the outside leads to peeling from the metal plate and growth of cracks.

Accordingly, in a can using the film on the inner surface, due to the voids and cracks, the contents come in direct contact with the metal of the can to cause reduction in the taste and aroma preservation or cause flavor problem. Also, in a can using the film on the outer surface, the printed appearance is reduced at a part where the film is whitened by the void. Further, due to the voids and cracks, the problem of corrosion of the can may be caused during long-term storage.

On the other hand, with an intrinsic viscosity of the polyesters more than the range, in the step of melting the resin to produce the film, the load applied to a melt extruder increases, so that the production speed needs to be sacrificed or due to the prolonged melt retention time of the resin in the extruder, the reaction between the polyester resins excessively proceeds to degrade the properties of the film, resulting in degradation in physical properties of the laminated metal plate. Further, a polyester having excessively high intrinsic viscosity has a long polymerization time and a long polymerization process, resulting in increase in the costs.

The polymerization method of the raw material polyesters is not particularly limited, and examples thereof include a transesterification method and a direct polymerization method. Examples of a transesterification catalyst include an oxide and an acetate of Mg, Mn, Zn, Ca, Li and Ti. Examples of the polycondensation catalyst include a compound such as an oxide and an acetate of Sb, Ti, Ge and Al, and organic sulfonic acid compounds. After film-making, in the case where the film comes in direct contact with a food, it is preferable that the film contain no Sb compounds or organic sulfonic acid compounds. Accordingly, it is preferable that the polyester be polymerized by using a Ti or Ge compound as polycondensation catalyst. Since the polyester after polymerization contains monomers, oligomers, and by-products such as acetaldehyde and tetrahydrofuran, it is preferable to perform solid-phase polymerization at a temperature of 200° C. or more under reduced pressure or inert gas flow.

In the polymerization of the polyester, additives such as an antioxidant, a heat stabilizer, an ultraviolet absorber, and an antistatic agent may be added on an as needed basis. Examples of the antioxidant include a hindered phenol compound and a hindered amine compound, examples of the heat stabilizer include a phosphorus compound, and examples of the ultraviolet absorber include a benzophenone compound and a benzotriazole compound. Further, in order to inhibit the reaction between the polyesters (A) and (B), it is preferable to add a phosphorus compound as conventionally known reaction inhibitor before polymerization, during polymerization, or after polymerization. It is more preferable that the addition is performed at the end of melt polymerization before solid polymerization.

The polyester film of the present invention is produced through a sheet forming step for forming a melt-kneaded product containing the polyester (A) and the polyester (B) into an unstretched sheet, and then a stretching step of stretching the unstretched sheet in the flow direction of the sheet (MD stretching) and then stretching in the width direction (TD stretching).

In the sheet forming step, a melt-kneaded product containing the polyester (A) and the polyester (B) is formed into a sheet form to obtain an unstretched sheet.

In melt kneading, it is preferable that the polyester (A) and the polyester (B) have a small difference in melt viscosity at the extrusion temperature. With a large difference in melt viscosity between the polyester (A) and the polyester (B), the film tends to have appearance defects called as flow marks over the whole. In addition, the accuracy of blending ratio in the width direction of the film decreases and thickness variation tends to occur. Specifically, the difference in melt viscosity between the polyester (A) and the polyester (B) at extrusion temperature is preferably 65 Pa·s or less, more preferably 60 Pa·s or less, still more preferably 40 Pa·s or less, and most preferably 20 Pa·s or less. Accordingly, as the material for producing the polyester film, the polyester (A) and the polyester (B) having a difference in melt viscosity in the range are preferably used in combination.

The preparation of the melt kneaded product may be performed by a known method. For example, raw materials including the polyester (A) and the polyester (B) are fed into an extruder having a heating device, and melted by heating to a specified temperature.

In preparation of the melt-kneaded product, for the purpose of improving the process passability during film production and can-making, it is preferable that a small amount of inorganic lubricant such as silica, alumina and kaolin be added to impart slip properties to the film surface. Further, for the purpose of improving the film appearance and printability, for example, a silicone compound may be contained.

The amount of the inorganic lubricant added is preferably 0.001 to 0.5 mass % or 0.05 to 0.3 mass %.

The average particle size of the inorganic lubricant is preferably 1 to 3 μm, more preferably 2 to 3 μm. With an average particle size of less than 1 μm, the inorganic lubricant has insufficient slip properties, and with an average particle size of more than 3 μm, the transparency of the film decreases.

Also, titanium dioxide in an amount of up to about 20 mass % may be added for the purpose of shielding in combination with the function as lubricant.

During the amorphous treatment in a can-making process, a low-molecular weight polymer incompatible with the polyester (A) and the polyester (B) may be added to prevent insufficient slip properties due to burying of the lubricant. Examples of the low-molecular weight polymer include polyethylene, polypropylene, polystyrene and polyamide, and from the viewpoint of balance between stability and compatibility in mixing with the polyester (A) and the polyester (B), a polyolefin such as polyethylene and polypropylene is preferred. The film used on the inner surface of a can comes into direct contact with a mold called as punch in drawing with ironing, so that slip properties are more required in comparison with the film used on the outer surface. It is therefore preferable that to the film used on the inner surface of a can, a low-molecular weight polymer such as polyethylene be added in addition to an inorganic lubricant.

The weight average molecular weight Mw of the low-molecular weight polymer is preferably 30000 or less, more preferably 25000 or less, and still more preferably 20000 or less.

The content of the low-molecular weight polymer is preferably 0.01 to 1.0 mass %, more preferably 0.01 to 0.3 mass. With a content of the low-molecular weight polymer of less than 0.01 mass %, the effect for improving the slip properties may not be exhibited. Further, with a content of the low-molecular weight polymer of more than 1.0 mass %, the film not only has excessive quality of slip properties on the surface, but also may become brittle, or may have degraded impact resistance after can-making and degraded flavor properties as the amount of the incompatible low-molecular weight polymer increases.

A film containing a low-molecular weight polymer in an outermost layer not only has excessive quality of slip properties, but also tends to have deviation in winding in film-making and roll contamination in can-making. It is therefore preferable that the low-molecular weight polymer be contained in a layer other than outermost layer of the film having a multi-layer structure so as to bleed out on the surface of the film during the amorphous treatment in a can-making process.

The film of the present invention has a dynamic friction coefficient of, preferably 0.20 to 0.60, more preferably 0.30 to 0.50, in a state before thermal lamination described below, With a dynamic friction coefficient of less than 0.20, the film has excessive slip properties, so that deviation in winding during film making tends to occur. With a dynamic friction coefficient of more than 0.60, scratches occur due to friction with a roll in a film-making process, and peeling defects between films called as blocking occur after winding, so that appearance defects may be observed during unwinding of the film.

The unstretched sheet as a molding formed into a sheet may be obtained by extruding the melt-kneaded product with a f-die and cooled and solidified with a casting drum or the like at a temperature controlled to equal to or less than the room temperature. The space between discharge ports of the T-die is preferably 1.0 to 2.5 mm, more preferably 1.5 to 2.2 mm. With a space between discharge ports of the T-die of less than 1.0 mm, the thickness of the unstretched sheet is hardly controlled, and with a space of more than 2.5 mm, the thickness variation of the unstretched sheet tends to increase.

The average thickness of the unstretched sheet is not particularly limited, usually 50 to 1000 μm, preferably 100 to 800 μm. With an average thickness controlled in the range, the unstretched sheet may be more effectively stretched.

In the present invention, in the stretching step including MD stretching for stretching the unstretched sheet in the flow direction of the sheet and subsequent TD stretching for stretching in the width direction, the MD stretching is required to be performed in two or more stages.

The ratio between the MD stretching magnification (X) represented by a product of stretching magnifications in the respective stages of the MD stretching and the TD stretching magnification (Y), i.e., stretching magnification ratio (X/Y), is required to be 0.82 to 1.10. In the case of producing a polyester film to compose the outer surface of a metal can, the stretching magnification ratio (X/Y) is preferably 1.00 to 1.10, more preferably 1.05 to 1.10, from the viewpoint of the transparency after high-order drawing and ironing. On the other hand, in the case of producing a polyester film to compose the inner surface of a metal can, the stretching magnification ratio (X/Y) is preferably 0.85 to 0.95, more preferably 0.85 to 0.90, from the viewpoints of the adhesiveness between the film and a metal plate and the long-term preservability after retort treatment.

Further, the area magnification (X×Y) is required to be 12.00 to 16.00. In the case of producing a polyester film to compose the outer surface of a metal can, the area magnification (X×Y) is preferably 14.50 to 16.00, from the viewpoint of the transparency after high-order drawing and ironing. On the other hand, in the case of producing a polyester film to compose the inner surface of a metal can, the area magnification (X×Y) is preferably 12.50 to 14.00, from the viewpoints of the adhesiveness between the film and a metal plate and the long-term preservability after retort treatment.

In the production method of a polyester film of the present invention, the MD stretching step is required to be a multi-stage stretching with two or more stages. The MD stretching is usually performed using two or more rolls with difference in peripheral velocity. Use of multi-stage stretching for the MD stretching enables the stretching stress to be reduced, so that the load applied to rolls are reduced. Further, the stretching temperature can be reduced, so that the film is prevented from being fusion-bonded to a roll or wound around a roll. As a result, the thickness variation of the film in the flow direction (MD) can be reduced. The MD stretched film with reduced thickness variation in the flow direction (MD) of the film is subjected to TD stretching, so that the thickness variation in the four directions specified in the present invention can be reduced. Due to multi-stage stretching, the film has an increased crystallization index, so that impact resistance, barrier properties after retort treatment, taste and flavor retention properties and flavor properties can be improved.

In the multi-stage MD stretching, it is preferable that the unstretched sheet before stretching be temperature-controlled in the range of 25 to 60° C. in advance. With a temperature of less than 25° C., the unstretched sheet may be fractured during stretching in some cases, and with a temperature of more than 60° C., the unstretched sheet may wind around a roll.

In the MD stretching in a first stage (MD1 stretching), the stretching temperature is preferably 50 to 80° C., more preferably 55 to 75° C., still more preferably 60 to 70° C.

Also, the stretching magnification in the MD1 stretching is preferably 1.1 to 1.5. With a stretching magnification of 1.1 or less, no stretching effect is exhibited, while with a stretching magnification of more than 1.5, oriented crystallization of the film notably proceeds, so that the stress increases during stretching in the second or later stage, resulting in easy fracture of the film.

Following the first-stage MD stretching (MD1 stretching), a second-stage MD stretching (MD2 stretching) is performed. Further, a third- or later-stage MD stretching may be performed. It is preferable that the MD stretching step be a two-stage to three-stage multi-stage stretching. Hereinafter, an n-th stage MD stretching is referred to as MDn stretching.

The stretching temperature of the Mon stretching is preferably 50 to 80° C., more preferably 55 to 75° C., still more preferably 55 to 70° C.

Also, the stretching magnification of the MDn stretching is preferably 1.2 to 3.5.

It is preferable that the stretching magnification be increased in stages, such that the stretching magnification $(X_{n+1})$ in a (n+1)-th stage is higher than the stretching magnification $(X_n)$ in an n-th stage. The ratio $(X_{n+1}/X_n)$ is preferably 1.1 to 3.5, more preferably 1.3 to 3.3, and still more preferably 1.5 to 3.0, With a ratio $(X_{n+1}/X_n)$ of less than 1.1, the film has an increased crystallization index, so that the thermal lamination properties to a metal plate tend to be degraded, and with a ratio $(X_{n+1}/X_n)$ of more than 3.5, the film has a decreased crystallization index, so that insufficient performance of taste and flavor retention properties and flavor properties, in particular, tends to be obtained.

Further, in the multi-stage stretching, the MD stretching magnification (X) represented by the product of the stretching magnifications in the respective stages is preferably 2.5 to 3.8, more preferably 2.8 to 3.5.

As the method for heating a film in the MD stretching step, known methods such as passing a film through heating rolls and infrared heating between rolls for MD stretching may be used alone or in combination. In particular, the method for infrared heating a film between stretching rolls enables the temperature of the stretching rolls to be reduced, so that the film is prevented from being fusion-bonded to a roll or wound around a roll, resulting in further reduction in the MD thickness variation of the film.

The MD stretched film is then successively TD stretched. The TD stretching temperature is preferably 60 to 100° C., more preferably 70 to 95° C.

The magnification (Y) of the TD stretching is controlled depending on the physical properties required for the final product film, preferably 2.7 or more, more preferably 3.0 or more, particularly preferably 3.6 or more.

In the production method of a polyester film of the present invention, the stretching is required to have a Stretching magnification ratio (X/Y) of 0.82 to 1.10, and an area magnification (X×Y) of 12.00 to 16.00. In the case of stretching not satisfying the range of stretching magnification ratio, the resulting polyester film has poor balance of dry heat shrinkage rates in four directions, so that the difference between the maximum value and the minimum value of the heat shrinkage rates tends to exceed the range specified in the present invention, and depending on the area magnification (X×Y) value, the dry heat shrinkage rate in heat treatment at 200° C. for 15 minutes may not satisfy the range specified in the present invention in some cases. Further, with an area magnification (X×Y) of more than 16.00, the resulting polyester film has difficulty in satisfying the range of the dry heat shrinkage rate through heat treatment at 200° C. for 15 minutes specified in the present invention, and with an area magnification (X×Y) of less than 12.00, the resulting polyester film has difficulty in satisfying the range of the thickness variation specified in the present invention, so that the adhesiveness in thermal lamination at low temperature tends to be degraded.

The TD-stretched film is subsequently subjected to a thermal fixation treatment for increasing the crystallization index and a heat relaxation treatment for adjusting the thermal shrinkage properties of the film and the like, in which the film width is continuously shrunk.

It is preferable that the thermal fixation treatment temperature be 80 to 180° C. With a thermal fixation treatment temperature of less than 80° C., the resulting film has a small crystallization index, so that the strength may be insufficient. With a thermal fixation treatment temperature of more than 180° C., the resulting film has a too large crystallization index, so that thermally press-bonding to a metal plate tends to be difficult.

The heat relaxation treatment is performed preferably at 1 to 10% of the lateral stretching magnification. The film is then cooled to a temperature equal to or less than Tg of the film to obtain a biaxially stretched film.

The heat relaxation treatment after stretching is a step required for imparting dimensional stability to the film, and examples of the treatment method may include known methods such as hot air blowing, exposure to infrared, and exposure to microwaves. In particular, hot air blowing is most suitable, accurately achieving uniform heating.

The heat relaxation treatment temperature is preferably 140 to 200° C., more preferably 150 to 190° C., and most preferably 160 to 180° C., With a heat relaxation treatment temperature of less than 140° C., the dry heat shrinkage rate in the four directions in the present invention increases, so that it tends to become difficult to obtain the film of the present invention. With a heat relaxation temperature of more than 200° C., the thermal lamination properties with a metal plate are degraded, so that it tends to become difficult to obtain the film of the present invention.

The polyester film of the present invention may be provided with an adhesive layer by coextrusion, lamination or coating for the purpose of further improving the thermally press-bonding properties with a metal plate and the adhesiveness afterwards. The thickness of the adhesive layer is preferably 1 µm or less in terms of dry film thickness. The adhesive layer is not particularly limited, preferably a thermosetting resin layer made of epoxy resin, polyurethane resin, polyester resin or various modified resins thereof.

On the opposite side of the film to be thermally press-bonded to a metal plate, one or two or more resin layers may be provided in order to improve the appearance of the metal can body and the printability, or improve the heat resistance, retort resistance, etc., of the film. These layers may be provided by coextrusion, lamination or coating.

The laminated metal plate of the present invention includes the film laminated on a metal plate. Since the film has excellent thermal lamination properties with a metal plate, it is preferable that the laminated metal plate of the present invention include the film laminated directly on the metal plate without through an adhesive.

Examples of the metal plate on which the film of the present invention is laminated include a steel plate and an aluminum plate, and the metal plate for use may be subjected to chemical conversion treatment such as chromic acid treatment, phosphoric acid treatment, electrolytic chromic acid treatment and chromate treatment, or subjected to various plating treatments with nickel, tin, zinc, aluminum, gunmetal, brass or the like.

Examples of the method for laminating the film on a metal plate include press-bonding the metal plate preheated to 160 to 250° C. to the film by a roll controlled to a temperature lower than that of the metal plate by 30° C. or 50° C. or more to cause thermally press-bonding, and then cooling the laminate to room temperature. Thereby, a laminated metal plate can be continuously produced.

Examples of the method for heating the metal plate include thermal transfer with a heater roll, induction heating, resistance heating and hot air transmission, and thermal transfer with a heater roll is particularly preferred from the viewpoint of equipment cost and simplification of equipment.

As a cooling method after lamination, the laminate may be immersed in a coolant such as water, or may be brought into contact with a cooling roll.

The laminated metal plate obtained by the method has excellent can-making properties and may be directly subjected to processing. Alternatively, the laminated metal plate may be heat treated at a temperature higher than the melting point of the polyester by 10 to 30° C. and then quenched to make a film in an amorphous state (hereinafter, also referred to as "amorphous treatment"), so that higher processability can be imparted.

After the amorphous treatment of the film of the present invention thermally laminated with a metal plate, the film has a dynamic friction coefficient of, preferably 0.30 or less, more preferably 0.20 or less, in particular, in the case of using as inner surface film. With a dynamic friction coefficient of more than 0.30 after the amorphous treatment, the film of the present invention tends to have defects caused by friction with a die and punch in drawing with ironing.

The metal container of the present invention is obtained by forming the laminated metal plate. The metal container is subjected to processing into a form for use of filling with food and beverage, including a part of a metal container, for example, a can lid formed into a Shape subjected to a winding process. The excellent processability of the film of the present invention is exhibited particularly in production of a metal container using a can body component of three-piece can (3P can) subjected to harsh neck-in processing or a can body component of two-piece can (2P can) produced by drawing and ironing.

Having excellent retort resistance, flavor properties and corrosion resistance, the metal container of the present invention is suitable for filling with contents including various processed foods such as coffee, green tea, black tea, oolong tea, and in particular, a highly corrosive acidic beverage (fruit juice beverage) and milk beverage.

EXAMPLES

Next, the present invention is specifically described with reference to Examples.

The raw materials of the film in Examples and Comparative Examples, and the measurement method of characteristic values are as follows.

(Raw material)
Polyester (A)
A-1: homopolybutylene terephthalate (PBT), IV: 1.08 dl/g, Tm: 223° C., Ti catalyst content: 40 ppm, melt viscosity: 292 Pa·s (280° C.), 320 Pa·s (275° C.), 348 Pa·s (270° C.), 390 Pa·s (260° C.)
A-2: polybutylene terephthalate copolymerized with 5 mol % of sebacic acid (PBT/PBS5), IV: 0.92 dl/g, Tm: 217%, Ti catalyst content: 40 ppm, melt viscosity: 248 Pa·s (280° C.), 273 Pa·s (275° C.), 303 Pa·s (270° C.), 340 Pa·s (260° C.)
A-3: polybutylene terephthalate copolymerized with 12 mol % of sebacic acid (PBT/PBS12), IV: 0.95 dl/g, Tm: 204° C., Ti catalyst content: 40 ppm, melt viscosity: 251 Pa·s (280° C.), 282 Pa·s (275° C.), 305 Pa·s (270° C.), 345 Pa·s (260° C.)

Polyester (B)
B-1: homopolyethylene terephthalate (PET), IV: 0.75 dl/g, Tm: 255° C., Ge catalyst content: 40 ppm, melt viscosity: 285 Pa·s (280° C.), 310 Pa·s (275° C.), 333 Pa·s (270° C.), 375 Pa·s (260° C.)
B-2: homopolyethylene terephthalate (PET), IV: 0.64 dl/g, Tm: 255° C., Sb catalyst content: 100 ppm, melt viscosity: 237 Pa·s (280° C.), 265 Pa·s (275° C.), 291 Pa·s (270° C.), 336 Pa·s (260° C.)
B-3: polyethylene terephthalate copolymerized with 5 mol % of isophthalic acid (PET/PEI5), IV: 0.81 dl/g, Tm: 233° C., Ge catalyst content: 100 ppm, melt viscosity: 320 Pa·s (280° C.), 335 Pa·s (275° C.), 360 Pa·s (270° C.), 402 Pa·s (260° C.)
B-4: polyethylene terephthalate copolymerized with 8 mol % of isophthalic acid (PET/PEI8), IV: 0.73 dl/g, Tm: 228° C., Ge catalyst content: 100 ppm, melt viscosity: 281 Pa·s (280° C.), 302 Pa·s (275° C.), 329 Pa·s (270° C.), 360 Pa·s (260° C.)
B-5: polyethylene terephthalate copolymerized with 12 mol % of isophthalic acid (PET/PEI12), IV: 0.65 dl/g, Tm: 219° C., Ge catalyst content: 100 ppm, melt viscosity: 241 Pays (280° C.), 269 Pa·s (275° C.), 293 Pa·s (270° C.), 325 Pa·s (260° C.)
B-6: polyethylene terephthalate copolymerized with 3.5 mol % of 1,4-cyclohexane dimethanol (PET/CHDM), IV: 0.78 dl/g, Tm: 240° C., Ge catalyst content: 40 ppm, melt viscosity: 295 Pa·s (280° C.), 322 Pa·s (275° C.), 350 Pa·s (270° C.), 395 Pa·s (260° C.)

(Measurement Method)
a. Measurement Position of Film

Each of the physical properties of the film was measured at the central part of a formed polyester film in the width direction.

B. Melting Point (Tm)

The melting point was measured as follows using a DSC8000 manufactured by Perkin Elmer, Inc. A polyester film in amount of 9 mg was held at a constant temperature of 50° C. for 1 minute, heated to 280° C. at 300° C./min and held at the constant temperature for 1 minute, rapidly cooled to 50° C. at 300° C./min and held at the constant temperature for 3 minutes to make the film into an amorphous state, and then heated to 280° C. at 20° C./minute for the measurement.

C. Crystallization Index

The crystallization index was measured as follows using a DSC8000 manufactured by Perkin Elmer, Inc. A polyester film in amount of 9 mg was held at a constant temperature of 20° C. for 1 minute and heated to 280° C. at a rate of 20° C./min to measure a heat of melting ΔHm and a heat of crystallization during heating ΔHc. The difference (ΔHm−ΔHc) was calculated as the crystallization index (J/g). Incidentally, in the case where the melting peaks of the polyester (A) and the polyester (B) were completely separated, the following was assumed: ΔHm=ΔH{Polyester (A)}+ΔH{Polyester (B)}. In the case where the melting peaks of the polyester (A) and the polyester (B) were overlapped even a little, the whole heat of melting between the melting start temperature of the polyester (A) and the melting end temperature of the polyester (B) was assumed as ΔHm.

D. Dry Heat Shrinkage Rate

After a polyester film was subjected to moisture conditioning at 23° C., 50% RH for 2 hours, the polyester film was cut in the four directions consisting of a 0° direction as the film flow direction (MD) and at a 45° direction, a 90° direction (TD), and a 135° direction clockwise from MD, so as to collect samples having length of 100 mm in the measurement direction and a width of 10 mm in the direction perpendicular to the measurement direction (5 pieces in the respective directions) (samples after moisture conditioning 1).

The samples collected were exposed to dry air under conditions at 160° C. for 30 minutes, or at 200° C. for 15 minutes, and then subjected to moisture conditioning in an environment at 23° C., 50% RH for 2 hours (samples after moisture conditioning 2). The sample length was measured after the moisture conditioning 1 and the moisture conditioning 2 to calculate the dry heat shrinkage rate based on the following equation. The average of the calculated values of the 5 pieces was used.

Dry heat shrinkage rate (%)=[((Sample length after moisture conditioning 1)−(Sample length after moisture conditioning 2))/(sample length after moisture conditioning 1)]×100

E. Thickness Variation

After the polyester film was subjected to moisture conditioning in an environment at 23° C., 50% RH for 2 hours, total four straight lines L1 to L4 with a length of 100 mm were drawn in each of the four directions consisting of a 0° direction (a) as the film flow direction (MD) and a 45° direction (b), a 90° direction (TD) (c), and a 135° direction (d) clockwise from MD, from a central point A at an arbitrary position on the film as shown in FIG. 1. The thickness was measured at 10 points at 10 mm intervals from the central point on each of the straight lines, i.e., at 40 points in total, using a thickness gauge (HEIDENHAIN-METRO MT1287, manufactured by Heidenhain Co.).

In the measurement values at the 40 points, the maximum thickness is represented by $T_{max}$, the minimum thickness by $T_{min}$, and the average thickness by $T_{ave}$. The thickness variation was calculated from the following equation:

Thickness variation (%)=$(T_{max}-T_{min})/T_{ave}\times 100$

F. Adhesiveness

A polyester film overlapping a tin-free steel plate having a thickness of 0.21 mm was supplied between a metal roll heated to 180° C., 190° C. or 200° C. and a silicone rubber roll such that the tin-free steel plate came in contact with the metal roll and the polyester film came in contact with the silicone rubber roll, and through thermobonding at a speed of 20 m/minute under a linear pressure of $4.9\times10^4$ N/m for 2 seconds and subsequent cooling by immersion in iced water, a laminated metal plate was obtained.

A laminated metal plate was also obtained in the same manner as described above, except that the preset temperature of the metal roll was controlled to 220° C. and the thermobonding time was changed to 1 second.

From a resulting laminated metal plate, 10 test pieces in a strip form having a width of 18 mm (long side in MD of film, short side in TD of film, ends not laminated, and laminated part having a length of 8 cm or more in MD) were cut out. Subsequently, an adhesive tape specified in JIS Z-1522 was attached to the film surface of the test piece for the measurement of the peel strength thereof through a 180-degree peeling test at a rate of 10 mm/minute using an autograph manufactured by Shimadzu Corporation. In the case of a peel strength of 2.9 N or more, it was observed that the peel interface of the laminated metal plate moved from the polyester film/tin-free steel plate to film cutting resulting from cohesive failure of the polyester film or tension in many cases, so that the evaluation basis for adhesiveness in the present invention was set to 2.9 N. Based on the number of test pieces having a peel strength of 2.9 N or more, the adhesiveness between the polyester film and the tin-free steel plate was evaluated. The number of test pieces having a peel strength of 2.9 N or more is practically 6 or more, preferably 8 or more, more preferably all of the 10.

G. Adhesiveness After Storage Test (at 50° C. for 3 Months)

The laminated metal plate obtained in F described above was subjected to retort treatment at 120° C. for 30 minutes and it was stored at 50° C. for 3 months. Then, from the laminated metal plate, 10 pieces of test pieces in a strip form having a width of 18 mm (long side in MD of film, short side in TD of film) were cut out and subjected to measurement of peel strength in the same manner as in F described above. The adhesiveness between the polyester film and the tin-free steel plate after the storage test was evaluated based on the number of the test pieces having a peel strength of 2.9 N or more in the 10 test pieces in the same manner as in F described above.

H. Can-Making Properties

The laminated metal plate obtained in F described above was subjected to an amorphous treatment by heating at 260° C. for 30 seconds using a hot air oven and then quenching. The laminated metal plate through the amorphous treatment was subjected to drawing and ironing using a die and punch at a rate of 80 strokes/minute into a formed container having a bottom diameter of 65 mm and a height of 250 mm, so that a 2-piece can was made.

The resulting 2-piece can was subjected to retort treatment at 120° C. for 30 minutes, and then the internal part of the can was filled with 1 mass saline solution. When a voltage of 6V was applied to the can body as positive electrode, the current value was measured to evaluate the can-making properties based on the degree of the defects of the polyester film. The more current flow indicates that the more defects are present. The maximum current value is practically 5 mA or less, preferably 4 mA or less, more preferably 2.2 mA or less.

I. Covering Properties

In the evaluation on the can-making properties in H described above, after retort treatment at 120° C. for 30 minutes, storage at 50° C. for 3 months was performed. After that, the current value was measured in the same manner as in H. In the case of using as an inner surface film, the maximum current value is practically 5 mA or less, preferably 4 mA or less, more preferably 2.2 mA or less, after the storage test at 50° C. for 3 months.

J. Transparency

After a laminated metal plate was obtained by the method described in F described above using a metal plate printed in black (L-value: 14.0), a 2-piece can was made by the method described in H. The L-value of a part printed in black of the metal plate laminated with an outer surface film was measured using a colorimeter (simplified spectrocolorimeter NF333, manufactured by Nippon Denshoku Industries Co., Ltd., light source: F8, visual angle: 10 degrees).

With decrease in the L-value measured, the degree of black color increases, so that the outer surface film has less impact on the printing appearance. With increase in the L-value, the degree of black color decreases, so that the outer surface film whitened has bad effect on the printing appearance.

In practical use of a metal can composed of a metal plate having an I-value of a part printed in black of 14.0 laminated with an outer surface film, the L-value is preferably less than 30, more preferably less than 20, still more preferably less than 16.

K. Taste and Flavor Retention Properties

Using a laminated metal plate obtained by thermal lamination under conditions with a metal roll temperature set at 200° C. in the method F described above, a two-piece can was obtained by the method H described above. The two-piece can was filled with water and subjected to a retort treatment at 120° C. for 30 minutes. Assuming that water filled in the two-piece can before the retort treatment has no taste and no smell, the water in the two-piece can after the retort treatment was subjected to the following 4-grade evaluation by 10 examiners.

Excellent: All the 10 examiners feel no taste or smell of metal.

Good: 1 to 2 of the examiners feel taste or smell of metal.

Fair: 3 to 4 of the examiners feel taste or smell of metal.

Poor: 5 or more of the examiners feel taste or smell of metal.

L. Film-Making Properties

The film-making properties were subjected to the following 3-grade evaluation based on the ratio of the maximum value of deviation in winding caused in 10000-m winding with a tension of 500 N/m in a winding process at a line speed of 150 m/min in film-making relative to the whole width of the winding roll.

Good: Less than 1% of the whole width of a winding roll.

Fair: 1 to 2% of the whole width of a winding roll.

Poor: More than 2% of the whole width of a winding roll.

M. Processability

The step of thermal lamination with a metal plate was operated for 24 hours at a metal roll temperature of 200° C. The low-molecular weight polymer component in the polyester film contaminated a silicone rubber roll. The silicone rubber roll was cleaned to remove the contaminant attached to the silicone rubber roll immediately before transferring to a polyester film. The processability was subjected to the following 3-grade evaluation based on the number of times of the cleaning of the silicone rubber roll.

Good: 0 to 1 time

Fair: 2 to 3 times

Poor: 4 times or more

N. Melt Viscosity

Four samples of vacuum-dried resin at 100° C. for 10 hours were measured with a varied load under conditions at temperature of 280° C., 275° C., 270° C. and 260° C., with a preheating time of 180 s using a flow tester (CFT-500, manufactured by Shimadzu Corporation) with a nozzle having a diameter of 0.5 mm and a length of 2.0 mm attached. From the resulting shear rate-melt viscosity curve, the apparent melt viscosity at a shear rate of $1000 \text{ s}^{-1}$ was determined.

O. Slip Property

According to JIS K7125, a laminated metal plate obtained by thermal lamination of a polyester film and a metal plate at 200° C. and subsequent amorphous treatment was subjected to moisture conditioning in an environment at 23° C. and 50% RH for 2 hours, and then a smooth metal jig having a surface area of 63 mm by 63 mm and a mass of 200 g was slid on the film under the same temperature and humidity conditions to measure the dynamic friction coefficient.

Example 1

A mixture of dry-blended 60 parts by mass of the polyester (A-1), 40 parts by mass of the polyester (B-1), and 0.08 mass % of agglomerated silica having an average particle size of 2.5 μm was extruded into a single-layer sheet form at 275° C. for a retention time of 8 minutes using an extruder having a T-die (space between discharge ports: 1.9 mm), and solidified by quenching to obtain an unstretched sheet such that the film after stretching had a thickness of 12 μm.

Next, the resulting unstretched sheet was successively stretched by biaxial stretching, First, a first-stage MD stretching was performed at a magnification of 1.15 and then a second-stage MD stretching was continuously performed at a magnification of 3.00 to have an MD stretching magnification (X) of 3.45 by a longitudinal stretching machine. The stretching temperature was 70° C. in both the first-stage MD stretching and the second-stage MD stretching. Further, the ends of the MD-stretched film gripped by clips of a tenter-type transverse stretching machine and stretched to have a TD stretching magnification (Y) of 3.70. As a result of these stretchings, the stretching magnification ratio (X/Y) was 0.93 and the area magnification (X×Y) was 12.77.

Next, after subjected to a heat relaxation treatment at a heat relaxation temperature controlled to 160° C. with a relaxation rate in TD controlled to 5.0% for 4 seconds, the film was cooled to room temperature and wound into a roll form to obtain a polyester film having a thickness of 12 μm.

Examples 2 to 43 and Comparative Examples 1 to 17

A polyester film having a thickness of 12 μm was obtained in the same manner as in Example 1, except that the types of the polyester (A) and the polyester (B), the mass ratio between them, and conditions in the sheet forming step, the number of constituent layers, conditions in the stretching step and the heat relaxation step were changed as shown in Tables 1, 4 and 7.

Incidentally, in Examples 35 to 38, an unstretched sheet having multiple layers was formed by an extrusion method using a multi-layer feed block.

In Examples 34 to 38, a layer containing a polyethylene wax (BBP643, manufactured by Sumika Color Co., Ltd., weight average molecular weight: 17500) was provided as a low-molecular weight polymer at a ratio of 1.5 mass % relative to the total amount of the polyester (A) and the polyester (B). The layer containing polyethylene wax was disposed as a second layer in a film having 2-layer structure in Example 35, as a second layer and a third layer in a film having 4-layer structure in Example 36, as a third layer in a film having 5-layer structure in Example 37, and as a fifth layer and a sixth layer in a film having 10-layer structure in Example 38, respectively.

In Example 35, the measurement of the dynamic friction coefficient was performed using the layer containing the low-molecular weight polymer as the measurement surface.

The characteristics of the resulting polyester films are shown in Tables 1 to 9.

TABLE 1

| | | Polyester | | | | | Layer structure | | Sheet forming step | |
|---|---|---|---|---|---|---|---|---|---|---|
| | | Type | | | | Difference in melt viscosity | Layer position of low-molecular | | | |
| | | | B | | | extrusion | Number of constituent | weight polymer-containing | Extrusion temperature | Retention time |
| | | A | b1 | b2 | Mass ratio (b1/b2) | Mass ratio (A/B) | temperature (Pa·s) | layers | layer | (°C.) | (min) |
| Example | 1 | A-1 | B-1 | — | 100/0 | 60/40 | 10 | 1 | — | 275 | 8 |
| | 2 | A-1 | B-1 | — | 100/0 | 60/40 | 10 | 1 | — | 276 | 8 |
| | 3 | A-1 | B-1 | — | 100/0 | 70/30 | 10 | 1 | — | 275 | 8 |
| | 4 | A-1 | B-1 | — | 100/0 | 55/25 | 10 | 1 | — | 275 | 8 |
| | 5 | A-1 | B-1 | — | 100/0 | 60/40 | 10 | 1 | — | 275 | 8 |
| | 6 | A-1 | B-1 | — | 100/0 | 50/40 | 10 | 1 | — | 276 | 8 |
| | 7 | A-1 | B-1 | — | 100/0 | 60/40 | 10 | 1 | — | 275 | 8 |
| | 8 | A-1 | B-1 | — | 100/0 | 60/40 | 10 | 1 | — | 275 | 8 |
| | 9 | A-1 | B-1 | — | 100/0 | 60/40 | 10 | 1 | — | 279 | 8 |
| | 10 | A-1 | B-1 | — | 100/0 | 60/40 | 10 | 1 | — | 275 | 8 |
| | 11 | A-1 | B-1 | — | 100/0 | 60/40 | 10 | 1 | — | 275 | 8 |
| | 12 | A-1 | B-1 | — | 100/0 | 60/40 | 10 | 1 | — | 2.75 | 8 |
| | 13 | A-1 | B-1 | — | 100/0 | 60/40 | 10 | 1 | — | 275 | 8 |
| | 14 | A-1 | B-1 | — | 100/0 | 60/40 | 10 | 1 | — | 273 | 8 |
| | 15 | A-1 | B-1 | — | 100/0 | 60/40 | 10 | 1 | — | 275 | 8 |
| | 16 | A-1 | B-1 | — | 100/0 | 60/40 | 10 | 1 | — | 275 | 8 |
| | 17 | A-1 | B-1 | — | 100/0 | 60/40 | 57 | 1 | — | 270 | 8 |
| | 18 | A-1 | B-1 | — | 100/0 | 50/40 | 57 | 1 | — | 270 | 8 |
| | 19 | A-1 | B-1 | — | 100/0 | 66/40 | 57 | 1 | — | 270 | 8 |
| | 20 | A-1 | B-1 | — | 100/0 | 80/40 | 57 | 1 | — | 270 | 8 |

| | | Stretching step | | | | | | | | | |
|---|---|---|---|---|---|---|---|---|---|---|---|
| | | MD stretching | | | | | | TD stretching | | | |
| | | Stretching condition in each stage | | | | | | | | | |
| | | | First stage | Second stage | Third stage | | | | | | |
| | | Temperature (°C.) | (MD1) Magnification (X1) | (MD2) Magnification (X2) | (MD3) Magnification (X3) | Magnification rate X2/X1 | Magnification rate X3/X2 | MD stretching Magnification (X) | Temperature (°C.) | TD stretching Magnification (Y) | Stretching Magnification ratio (X/Y) | Area magnification (X × Y) |
| Example | 1 | 70 | 1.16 | 3.00 | — | 2.81 | — | 3.45 | 85 | 3.70 | 0.93 | 12.77 |
| | 2 | 70 | 1.15 | 1.50 | 2.00 | 1.30 | 1.33 | 3.46 | 85 | 3.70 | 0.93 | 12.77 |
| | 3 | 70 | 1.15 | 3.00 | — | 2.81 | — | 3.45 | 85 | 3.70 | 0.93 | 12.77 |
| | 4 | 70 | 1.16 | 3.00 | — | 2.61 | — | 3.45 | 85 | 3.78 | 0.93 | 12.77 |
| | 5 | 70 | 1.15 | 2.80 | — | 2.43 | — | 3.22 | 88 | 3.90 | 0.83 | 12.56 |
| | 6 | 70 | 1.30 | 2.68 | — | 2.00 | — | 3.38 | 85 | 3.90 | 0.87 | 13.18 |
| | 7 | 70 | 1.80 | 1.90 | — | 1.06 | — | 3.42 | 85 | 3.70 | 0.92 | 12.65 |
| | 8 | 70 | 1.15 | 2.80 | — | 2.52 | — | 3.34 | 85 | 3.80 | 0.93 | 12.01 |
| | 9 | 70 | 1.45 | 2.50 | — | 1.72 | — | 3.63 | 85 | 3.70 | 0.85 | 13.41 |
| | 10 | 70 | 1.10 | 3.30 | — | 3.00 | — | 3.63 | 85 | 3.20 | 0.98 | 10.40 |
| | 11 | 70 | 1.15 | 3.46 | — | 2.98 | — | 3.01 | 85 | 4.00 | 0.98 | 13.23 |
| | 12 | 70 | 1.20 | 3.15 | — | 2.63 | — | 3.78 | 85 | 3.50 | 1.08 | 16.05 |
| | 13 | 70 | 1.13 | 3.50 | — | 3.19 | — | 4.07 | 86 | 3.78 | 1.10 | 12.77 |
| | 14 | 70 | 3.00 | 1.15 | — | 0.38 | — | 3.45 | 85 | 3.70 | 0.93 | 12.77 |
| | 15 | 70 | 1.15 | 3.00 | — | 2.61 | — | 3.45 | 55 | 3.70 | 0.93 | 12.77 |
| | 16 | 70 | 1.15 | 3.00 | — | 2.61 | — | 3.45 | 88 | 3.70 | 0.93 | 12.77 |
| | 17 | 70 | 1.15 | 3.00 | — | 2.61 | — | 3.45 | 85 | 3.70 | 0.93 | 12.77 |
| | 18 | 70 | 1.15 | 3.00 | — | 2.81 | — | 3.45 | 86 | 3.30 | 0.91 | 12.77 |
| | 19 | 70 | 1.15 | 3.00 | — | 2.61 | — | 3.45 | 85 | 3.76 | 0.93 | 12.77 |
| | 20 | 70 | 1.15 | 3.00 | — | 2.61 | — | 3.45 | 85 | 3.78 | 0.93 | 12.77 |

TABLE 2

| | | Thermal fixation treatment step Temperature (° C.) | Heat relaxation treatment step Temperature (° C.) | Properties of polyester film | | | | | |
|---|---|---|---|---|---|---|---|---|---|
| | | | | Thickness | | Crystallization index (J/g) | Melting point (° C.) | Tc (° C.) | Tcc (° C.) |
| | | | | Average (μm) | Thickness variation (%) | | | | |
| Example | 1 | 160 | 160 | 12.34 | 3.5 | 40 | 220/250 | 75 | 165 |
| | 2 | 150 | 150 | 12.42 | 2.3 | 45 | 220/250 | 49 | 176 |
| | 3 | 150 | 160 | 12.13 | 3.6 | 48 | 220/250 | 72 | 166 |
| | 4 | 180 | 180 | 12.25 | 3.9 | 33 | 220/250 | 72 | 165 |
| | 5 | 180 | 180 | 11.31 | 7.8 | 42 | 220/250 | 69 | 168 |
| | 6 | 160 | 160 | 12.23 | 3.2 | 44 | 220/250 | 66 | 171 |
| | 7 | 150 | 160 | 12.34 | 7.3 | 53 | 220/250 | 43 | 179 |
| | 8 | 160 | 160 | 12.12 | 8.9 | 41 | 220/250 | 71 | 166 |
| | 9 | 180 | 160 | 11.95 | 2.8 | 45 | 220/250 | 59 | 170 |
| | 10 | 160 | 160 | 11.95 | 7.8 | 35 | 220/260 | 80 | 155 |
| | 11 | 160 | 160 | 12.05 | 5.3 | 36 | 220/250 | 75 | 156 |
| | 12 | 180 | 160 | 12.12 | 3.4 | 40 | 220/250 | 73 | 165 |
| | 13 | 180 | 160 | 12.15 | 2.2 | 35 | 220/250 | 88 | 155 |
| | 14 | 158 | 160 | 12.50 | 9.2 | 28 | 220/250 | 45 | 185 |
| | 15 | 180 | 160 | 11.93 | 7.8 | 40 | 220/250 | 75 | 185 |
| | 16 | 360 | 160 | 12.03 | 7.1 | 40 | 220/250 | 75 | 166 |
| | 17 | 140 | 140 | 12.34 | 7.2 | 38 | 220/250 | 75 | 165 |
| | 18 | 150 | 150 | 12.04 | 7.5 | 39 | 220/250 | 75 | 166 |
| | 19 | 380 | 180 | 11.89 | 7.8 | 42 | 220/250 | 75 | 166 |
| | 20 | 200 | 200 | 12.34 | 7.7 | 51 | 220/250 | 60 | 188 |

| | | Properties of polyester film Dry heat shrinkage rate (%) | | | | | | | | | |
|---|---|---|---|---|---|---|---|---|---|---|---|
| | | 160° C. × 30 min | | | | | 200° C. × 15 min | | | | |
| | | MD | 45° | TD | 135° | Maximum − minimum | MD | 45° | TD | 135° | Maximum − minimum |
| Example | 1 | 15.0 | 15.7 | 14.8 | 14.8 | 0.3 | 27.1 | 27.2 | 26.4 | 27.6 | 1.2 |
| | 2 | 15.0 | 14.7 | 14.5 | 14.8 | 0.5 | 27.3 | 27.2 | 26.3 | 27.5 | 1.2 |
| | 3 | 16.9 | 15.9 | 15.7 | 38.8 | 1.2 | 25.8 | 25.0 | 24.1 | 25.6 | 1.7 |
| | 4 | 17.1 | 16.9 | 16.4 | 17.5 | 1.1 | 23.5 | 22.5 | 20.8 | 24.8 | 4.0 |
| | 5 | 13.8 | 15.3 | 17.3 | 15.8 | 3.5 | 26.5 | 28.0 | 31.0 | 28.3 | 4.5 |
| | 6 | 14.3 | 15.2 | 17.0 | 14.9 | 2.7 | 25.3 | 27.5 | 28.5 | 27.3 | 3.2 |
| | 7 | 15.3 | 15.1 | 14.8 | 16.0 | 0.5 | 27.4 | 27.0 | 26.2 | 28.9 | 1.2 |
| | 8 | 15.6 | 14.8 | 13.8 | 16.1 | 1.8 | 24.1 | 22.2 | 20.8 | 22.5 | 3.3 |
| | 9 | 18.0 | 15.3 | 14.1 | 15.0 | 1.9 | 28.0 | 23.0 | 26.2 | 27.3 | 1.8 |
| | 10 | 15.4 | 14.8 | 14.2 | 15.0 | 3.2 | 30.2 | 29.2 | 27.0 | 29.6 | 3.2 |
| | 11 | 19.2 | 17.8 | 15.3 | 17.6 | 3.9 | 34.9 | 34.8 | 31.5 | 34.0 | 3.4 |
| | 12 | 18.7 | 15.3 | 13.9 | 15.8 | 4.8 | 32.1 | 30.3 | 27.8 | 30.3 | 4.3 |
| | 13 | 18.7 | 15.3 | 13.8 | 15.0 | 4.9 | 33.5 | 31.2 | 30.5 | 31.6 | 3.0 |
| | 14 | 16.3 | 15.9 | 15.5 | 16.1 | 0.8 | 29.8 | 26.4 | 28.1 | 29.7 | 1.7 |
| | 15 | 15.2 | 14.8 | 14.8 | 15.0 | 0.4 | 26.9 | 28.0 | 25.5 | 28.1 | 1.6 |
| | 16 | 15.5 | 15.0 | 14.4 | 15.1 | 0.7 | 27.0 | 27.3 | 26.6 | 27.4 | 0.8 |
| | 17 | 19.3 | 18.6 | 10.1 | 18.2 | 3.2 | 34.6 | 34.2 | 33.1 | 34.8 | 1.7 |
| | 18 | 18.1 | 17.3 | 15.3 | 16.9 | 2.8 | 33.2 | 32.3 | 30.4 | 31.8 | 2.8 |
| | 19 | 13.4 | 12.2 | 11.2 | 12.8 | 2.2 | 17.2 | 18.4 | 15.6 | 16.5 | 1.6 |
| | 20 | 7.1 | 5.5 | 4.5 | 5.2 | 2.6 | 9.8 | 8.4 | 7.8 | 8.5 | 2.0 |

TABLE 3

| | | Properties of polyester film | | | | | | | | | | | |
|---|---|---|---|---|---|---|---|---|---|---|---|---|---|
| | | Slip properties Dynamic friction coefficient | | Adhesiveness (number of test pieces having a peeling strength of 2.9 N or more) | | | | | | | Can-making properties (Current value, mA) Thermal lamination temperature | | |
| | | | | After processing Thermal lamination temperature | | | | After preservation test Thermal lamination temperature | | | | | |
| | | Before thermal lamination | After amorphous treatment | 180° C. | 190° C. | 200° C. | 220° C. | 190° C. | 200° C. | 220° C. | 190° C. | 200° C. | 220° C. |
| Example | 1 | 0.43 | 0.23 | 7 | 10 | 10 | 10 | 10 | 10 | 10 | 2.1 | 0.9 | 0.8 |
| | 2 | 0.45 | 0.25 | 7 | 10 | 10 | 10 | 10 | 10 | 10 | 1.6 | 1.6 | 1.5 |
| | 3 | 0.45 | 0.25 | 7 | 10 | 10 | 10 | 9 | 9 | 9 | 2.5 | 1.8 | 2.9 |
| | 4 | 0.44 | 0.25 | 7 | 10 | 10 | 10 | 9 | 10 | 9 | 2.8 | 2.7 | 2.3 |
| | 5 | 0.43 | 0.24 | 6 | 9 | 10 | 8 | 8 | 10 | 8 | 2.3 | 1.1 | 3.3 |
| | 6 | 0.45 | 0.24 | 6 | 10 | 10 | 10 | 10 | 10 | 9 | 1.0 | 0.9 | 1.4 |
| | 7 | 0.43 | 0.25 | 6 | 7 | 9 | 9 | 7 | 9 | 9 | 3.8 | 1.7 | 1.6 |
| | 8 | 0.44 | 0.24 | 6 | 8 | 9 | 10 | 8 | 9 | 10 | 3.8 | 3.2 | 1.8 |
| | 9 | 0.46 | 0.24 | 7 | 10 | 10 | 10 | 10 | 10 | 10 | 2.3 | 0.8 | 1.0 |
| | 10 | 0.42 | 0.25 | 6 | 8 | 10 | 10 | 8 | 10 | 10 | 3.2 | 1.6 | 1.8 |
| | 11 | 0.43 | 0.26 | 7 | 10 | 10 | 8 | 10 | 10 | 8 | 3.3 | 1.5 | 4.2 |
| | 12 | 0.46 | 0.23 | 6 | 9 | 9 | 9 | 9 | 9 | 9 | 3.5 | 1.7 | 4.8 |
| | 13 | 0.44 | 0.24 | 7 | 10 | 10 | 9 | 10 | 10 | 9 | 3.3 | 2.2 | 3.4 |
| | 14 | 0.45 | 0.25 | 6 | 8 | 10 | 9 | 7 | 9 | 9 | 4.3 | 3.9 | 4.1 |
| | 15 | 0.46 | 0.24 | 6 | 8 | 9 | 9 | 8 | 9 | 9 | 4.8 | 4.3 | 3.8 |
| | 16 | 0.44 | 0.25 | 6 | 8 | 9 | 9 | 8 | 9 | 9 | 4.2 | 3.2 | 2.4 |
| | 17 | 0.42 | 0.23 | 6 | 8 | 8 | 8 | 8 | 8 | 8 | 4.2 | 3.8 | 3.2 |
| | 18 | 0.43 | 0.26 | 7 | 10 | 10 | 9 | 10 | 10 | 9 | 1.9 | 1.5 | 3.5 |
| | 19 | 0.45 | 0.25 | 7 | 10 | 10 | 10 | 10 | 10 | 10 | 1.9 | 1.5 | 1.5 |
| | 20 | 0.42 | 0.23 | 6 | 8 | 9 | 8 | 8 | 9 | 8 | 3.5 | 3.0 | 1.5 |

| | | Properties of polyester film | | | | | | | | |
|---|---|---|---|---|---|---|---|---|---|---|
| | | Covering properties (Current value, mA) Thermal lamination temperature | | | Transparency L value of part printed in black Thermal lamination temperature | | | Taste and flavor retention properties | Film making properties | Processability |
| | | 190° C. | 200° C. | 220° C. | 190° C. | 200° C. | 220° C. | | | |
| Example | 1 | 2.6 | 1.4 | 1.3 | 18.8 | 17.5 | 17.2 | ⊚ | ○ | ○ |
| | 2 | 2.1 | 2.1 | 2.0 | 17.8 | 18.1 | 17.9 | ⊚ | ○ | ○ |
| | 3 | 3.0 | 2.3 | 3.4 | 25.8 | 22.2 | 25.2 | ⊚ | ○ | ○ |
| | 4 | 3.3 | 3.2 | 2.8 | 29.8 | 25.4 | 25.8 | ⊚ | ○ | ○ |
| | 5 | 3.3 | 2.1 | 4.3 | 17.5 | 18.0 | 19.3 | ⊚ | ○ | ○ |
| | 6 | 1.0 | 0.9 | 1.4 | 17.9 | 17.1 | 17.6 | ⊚ | ○ | ○ |
| | 7 | 4.3 | 2.2 | 2.1 | 18.5 | 17.9 | 17.9 | ⊚ | ○ | ○ |
| | 8 | 4.9 | 4.2 | 2.8 | 19.2 | 19.0 | 18.5 | ⊚ | ○ | ○ |
| | 9 | 3.3 | 1.8 | 2.0 | 17.8 | 17.0 | 17.3 | ⊚ | ○ | ○ |
| | 10 | 4.2 | 2.6 | 2.8 | 17.4 | 16.9 | 17.3 | ⊚ | ○ | ○ |
| | 11 | 4.8 | 3.0 | 4.9 | 15.3 | 15.1 | 15.8 | ⊚ | ○ | ○ |
| | 12 | 4.5 | 2.8 | 4.9 | 15.5 | 15.2 | 16.1 | ⊚ | ○ | ○ |
| | 13 | 4.8 | 3.7 | 4.6 | 14.5 | 14.3 | 14.3 | ⊚ | ○ | ○ |
| | 14 | 4.8 | 4.4 | 4.6 | 21.8 | 20.8 | 20.5 | Δ | ○ | ○ |
| | 15 | 4.9 | 4.5 | 3.9 | 27.2 | 26.5 | 26.2 | ⊚ | ○ | ○ |
| | 16 | 4.3 | 3.4 | 2.5 | 26.5 | 25.6 | 25.2 | ⊚ | ○ | ○ |
| | 17 | 4.5 | 4.2 | 3.5 | 27.3 | 26.9 | 26.2 | ⊚ | ○ | ○ |
| | 18 | 2.4 | 2.0 | 4.0 | 17.7 | 17.8 | 18.5 | ⊚ | ○ | ○ |
| | 19 | 2.4 | 2.0 | 2.0 | 18.3 | 17.9 | 17.8 | ⊚ | ○ | ○ |
| | 20 | 4.0 | 3.5 | 2.0 | 18.4 | 18.5 | 17.2 | ⊚ | ○ | ○ |

TABLE 4

| | | Polyester | | | | | Layer structure | | Sheet forming step | |
|---|---|---|---|---|---|---|---|---|---|---|
| | | Type | | | | Difference in melt viscosity | | Layer position of | | |
| | | A | B | | Mass ratio (A/B) | extrusion temperature (Pa·s) | Number of constituent layers | low-molecular weight polymer-containing layer | Extrusion temperature (°C.) | Retention time (min) |
| | | | b1 | b2 | Mass ratio (b1/b2) | | | | | |
| Example | 21 | A-1 | B-2 | — | 100/0 | 60/40 | 57 | 1 | — | 270 | 8 |
| | 22 | A-1 | B-3 | — | 100/0 | 60/40 | 12 | 1 | — | 270 | 8 |
| | 23 | A-1 | B-3 | — | 100/0 | 60/40 | 12 | 1 | — | 270 | 8 |
| | 24 | A-1 | B-4 | — | 100/0 | 60/40 | 30 | 1 | — | 260 | 8 |
| | 25 | A-1 | B-4 | — | 100/0 | 80/40 | 30 | 1 | — | 260 | 8 |
| | 26 | A-1 | B-4 | — | 100/0 | 60/40 | 30 | 1 | — | 260 | 8 |
| | 27 | A-1 | B-4 | — | 100/0 | 60/40 | 30 | 1 | — | 280 | 8 |
| | 28 | A-1 | B-5 | — | 100/0 | 60/40 | 85 | 1 | — | 280 | 5 |
| | 29 | A-1 | B-5 | — | 100/0 | 60/40 | 85 | 1 | — | 260 | 5 |
| | 30 | A-1 | B-5 | — | 100/0 | 60/40 | 65 | 1 | — | 280 | 15 |
| | 31 | A-1 | B-6 | — | 100/0 | 60/40 | 5 | 1 | — | 260 | 8 |
| | 32 | A-2 | B-1 | — | 100/0 | 60/40 | 37 | 1 | — | 275 | 8 |
| | 33 | A-3 | B-1 | — | 100/0 | 60/40 | 34 | 1 | — | 280 | 8 |
| | 34 | A-1 | B-1 | — | 100/0 | 60/40 | 10 | 1 | 1 | 275 | 8 |
| | 35 | A-1 | B-1 | — | 100/0 | 60/40 | 10 | 2 | 2 | 275 | 8 |
| | 36 | A-1 | B-1 | — | 100/0 | 60/40 | 10 | 4 | 2, 3 | 275 | 8 |
| | 37 | A-1 | B-1 | — | 100/0 | 60/40 | 10 | 5 | 3 | 275 | 8 |
| | 38 | A-1 | B-1 | — | 100/0 | 60/40 | 10 | 10 | 5, 6 | 275 | 8 |
| | 39 | A-1 | B-4 | B-1 | 80/0 | 60/40 | 18/10 | — | — | 275 | 8 |
| | 40 | A-1 | B-4 | B-1 | 50/50 | 60/40 | 18/10 | — | — | 275 | 8 |

| | | Stretching step | | | | | | | | | |
|---|---|---|---|---|---|---|---|---|---|---|---|
| | | MD stretching | | | | | | TD stretching | | | |
| | | Stretching condition in each stage | | | | | | | | | |
| | | First stage | Second stage | Third stage | | | | | | | |
| | | Temperature (°C.) | (MD1) Magnification (X1) | (MD2) Magnification (X2) | (MD3) Magnification (X3) | Magnification ratio | | MD stretching Magnification (X) | Temperature (°C.) | TD stretching Magnification (Y) | Stretching Magnification ratio (X/Y) | Area magnification (X × Y) |
| | | | | | | X2/X1 | X3/X2 | | | | | |
| Example | 21 | 70 | 1.16 | 3.00 | — | 2.61 | — | 3.45 | 85 | 3.70 | 0.83 | 12.77 |
| | 22 | 70 | 1.15 | 3.00 | — | 2.61 | — | 3.46 | 85 | 3.70 | 0.83 | 12.77 |
| | 23 | 70 | 1.15 | 1.40 | 2.16 | 1.22 | 1.84 | 3.48 | 85 | 3.70 | 0.94 | 12.81 |
| | 24 | 70 | 1.16 | 3.00 | — | 2.61 | — | 3.46 | 85 | 3.70 | 0.93 | 12.77 |
| | 25 | 70 | 1.15 | 1.60 | 2.00 | 1.30 | 1.33 | 3.45 | 88 | 3.70 | 0.83 | 12.77 |
| | 26 | 70 | 1.10 | 3.30 | — | 3.00 | — | 3.63 | 85 | 3.70 | 0.96 | 13.43 |
| | 27 | 70 | 1.80 | 1.90 | — | 1.08 | — | 3.42 | 85 | 3.70 | 0.92 | 12.65 |
| | 28 | 70 | 1.15 | 3.00 | — | 2.61 | — | 3.45 | 86 | 3.70 | 0.93 | 12.77 |
| | 29 | 70 | 1.45 | 1.80 | 1.95 | 1.45 | 1.22 | 3.43 | 85 | 3.70 | 0.93 | 12.70 |
| | 30 | 70 | 1.10 | 3.00 | — | 2.61 | — | 3.46 | 86 | 3.70 | 0.83 | 12.77 |
| | 31 | 70 | 1.15 | 3.00 | — | 2.61 | — | 3.46 | 85 | 3.70 | 0.83 | 12.77 |
| | 32 | 70 | 1.20 | 3.00 | — | 2.61 | — | 3.45 | 85 | 3.70 | 0.93 | 12.77 |
| | 33 | 70 | 1.13 | 3.00 | — | 2.61 | — | 3.45 | 86 | 3.70 | 0.93 | 12.77 |
| | 34 | 70 | 3.00 | 3.00 | — | 2.61 | — | 3.43 | 85 | 3.70 | 0.81 | 12.77 |
| | 35 | 70 | 1.15 | 3.00 | — | 2.61 | — | 3.48 | 85 | 3.70 | 0.93 | 12.77 |
| | 36 | 70 | 1.15 | 3.00 | — | 2.61 | — | 3.45 | 86 | 3.70 | 0.93 | 12.77 |
| | 37 | 70 | 1.15 | 3.00 | — | 2.61 | — | 3.46 | 86 | 3.70 | 0.93 | 12.77 |
| | 38 | 70 | 1.15 | 3.00 | — | 2.81 | — | 3.45 | 86 | 3.70 | 0.93 | 12.77 |
| | 39 | 70 | 1.15 | 3.00 | — | 2.61 | — | 3.43 | 85 | 3.70 | 0.93 | 12.77 |
| | 40 | 70 | 1.15 | 3.00 | — | 2.61 | — | 3.45 | 86 | 3.70 | 0.93 | 12.77 |

TABLE 5

| | | Thermal fixation treatment step Temperature (° C.) | Heat relaxation treatment step Temperature (° C.) | Properties of polyester film | | | | | |
|---|---|---|---|---|---|---|---|---|---|
| | | | | Thickness | | Crystallization index (J/g) | Melting point (° C.) | Tc (° C.) | Tcc (° C.) |
| | | | | Average (μm) | Thickness variation (%) | | | | |
| Example | 21 | 206 | 205 | 12.53 | 7.9 | 52 | 220/250 | 58 | 189 |
| | 22 | 150 | 150 | 12.54 | 6.2 | 40 | 217/230 | 71 | 166 |
| | 23 | 160 | 160 | 12.07 | 2.5 | 50 | 217/230 | 49 | 182 |
| | 24 | 160 | 160 | 12.43 | 6.8 | 40 | 219/226 | 72 | 169 |
| | 25 | 160 | 160 | 12.28 | 2.5 | 50 | 218/226 | 49 | 179 |
| | 26 | 160 | 160 | 11.76 | 8.2 | 35 | 219/226 | 78 | 161 |
| | 27 | 160 | 160 | 12.32 | 9.5 | 53 | 219/225 | 42 | 185 |
| | 28 | 180 | 180 | 11.89 | 9.5 | 40 | 219 | 30 | 169 |
| | 29 | 150 | 150 | 11.87 | 8.6 | 50 | 219 | 46 | 187 |
| | 30 | 180 | 160 | 12.34 | 8.3 | 40 | 210 | 75 | 155 |
| | 31 | 160 | 180 | 12.52 | 7.3 | 40 | 218/235 | 75 | 184 |
| | 32 | 160 | 160 | 12.28 | 6.4 | 33 | 214/247 | 75 | 185 |
| | 33 | 160 | 160 | 12.03 | 6.2 | 29 | 197/249 | 74 | 165 |
| | 34 | 160 | 160 | 12.31 | 3.6 | 40 | 220/250 | 72 | 165 |
| | 35 | 160 | 180 | 12.37 | 4.6 | 40 | 220/250 | 76 | 165 |
| | 38 | 160 | 160 | 12.37 | 4.6 | 40 | 220/250 | 72 | 163 |
| | 37 | 160 | 160 | 12.41 | 6.7 | 40 | 220/250 | 76 | 165 |
| | 38 | 160 | 160 | 12.16 | 9.1 | 40 | 220/250 | 73 | 163 |
| | 39 | 160 | 160 | 12.22 | 6.8 | 40 | 220/233 | 76 | 168 |
| | 40 | 160 | 160 | 12.38 | 6.8 | 40 | 220/238 | 73 | 164 |

| | | Properties of polyester film Dry heat shrinkage rate (%) | | | | | | | | | |
|---|---|---|---|---|---|---|---|---|---|---|---|
| | | 160° C. × 30 min | | | | | 200° C. × 15 min | | | | |
| | | MD | 45° | TD | 135° | Maximum − minimum | MD | 45° | TD | 135° | Maximum − minimum |
| Example | 21 | 4.2 | 2.3 | 1.3 | 1.7 | 2.9 | 4.2 | 3.5 | 2.6 | 3.7 | 1.6 |
| | 22 | 17.3 | 17.0 | 16.2 | 16.7 | 1.1 | 33.1 | 32.2 | 31.2 | 31.9 | 1.9 |
| | 23 | 17.2 | 17.1 | 16.0 | 16.7 | 1.2 | 32.9 | 32.5 | 30.8 | 32.0 | 2.1 |
| | 24 | 16.8 | 18.2 | 15.3 | 16.5 | 1.5 | 31.2 | 30.4 | 29.8 | 30.7 | 1.4 |
| | 25 | 16.5 | 15.8 | 15.0 | 16.0 | 1.5 | 31.8 | 30.8 | 30.0 | 30.6 | 1.8 |
| | 26 | 16.4 | 15.5 | 15.0 | 15.8 | 1.4 | 30.8 | 30.4 | 29.5 | 29.9 | 1.3 |
| | 27 | 16.7 | 16.1 | 15.2 | 16.2 | 3.5 | 38.1 | 30.2 | 29.3 | 30.5 | 1.8 |
| | 28 | 15.8 | 15.1 | 14.0 | 14.9 | 1.8 | 30.1 | 29.2 | 28.0 | 29.5 | 2.1 |
| | 29 | 15.6 | 14.9 | 14.2 | 15.2 | 1.4 | 30.3 | 29.6 | 28.4 | 29.5 | 1.9 |
| | 30 | 16.3 | 15.1 | 13.5 | 14.8 | 2.8 | 30.3 | 28.8 | 27.4 | 29.0 | 2.9 |
| | 31 | 17.5 | 17.3 | 16.4 | 17.0 | 1.1 | 34.2 | 33.2 | 31.6 | 33.0 | 2.4 |
| | 32 | 17.0 | 15.5 | 14.9 | 15.3 | 2.1 | 27.1 | 26.0 | 25.0 | 26.3 | 2.1 |
| | 33 | 16.3 | 15.3 | 13.0 | 15.0 | 3.3 | 28.1 | 26.9 | 24.3 | 27.3 | 3.8 |
| | 34 | 14.9 | 15.0 | 14.7 | 14.8 | 0.3 | 25.9 | 27.4 | 28.4 | 27.5 | 1.1 |
| | 35 | 16.1 | 15.2 | 15.3 | 14.7 | 1.4 | 28.3 | 28.2 | 27.1 | 27.2 | 1.2 |
| | 38 | 16.3 | 15.0 | 15.1 | 14.6 | 1.7 | 28.2 | 28.1 | 27.0 | 27.1 | 1.2 |
| | 37 | 17.2 | 15.3 | 15.6 | 15.3 | 1.9 | 29.6 | 28.6 | 27.9 | 26.9 | 2.7 |
| | 38 | 16.8 | 16.2 | 15.9 | 14.7 | 2.1 | 28.5 | 28.9 | 27.3 | 27.1 | 1.8 |
| | 39 | 16.6 | 18.0 | 15.0 | 16.2 | 1.8 | 31.0 | 30.3 | 29.5 | 30.7 | 1.5 |
| | 40 | 15.9 | 15.6 | 14.8 | 14.9 | 1.1 | 30.9 | 30.3 | 29.1 | 30.1 | 1.6 |

TABLE 6

| | | Properties of polyester film | | | | | | | | | | |
|---|---|---|---|---|---|---|---|---|---|---|---|---|
| | | Slip properties Dynamic friction coefficient | | Adhesiveness (number of test pieces having a peeling strength of 2.9 N or more) | | | | | | | Can-making properties (Current value, mA) Thermal lamination temperature | | |
| | | | | After processing Thermal lamination temperature | | | | After preservation test Thermal lamination temperature | | | | | |
| | | Before thermal lamination | After amorphous treatment | 180° C. | 190° C. | 200° C. | 220° C. | 190° C. | 200° C. | 220° C. | 190° C. | 200° C. | 220° C. |
| Example | 21 | 0.46 | 0.26 | 5 | 6 | 6 | 6 | 6 | 6 | 6 | 5.1 | 4.4 | 3.6 |
| | 22 | 0.42 | 0.23 | 9 | 9 | 10 | 10 | 9 | 8 | 8 | 3.4 | 1.7 | 2.1 |
| | 23 | 0.46 | 0.24 | 10 | 10 | 10 | 10 | 10 | 10 | 10 | 0.7 | 0.7 | 0.8 |
| | 24 | 0.42 | 0.23 | 9 | 9 | 10 | 9 | 8 | 9 | 8 | 3.1 | 2.5 | 2.3 |
| | 25 | 0.45 | 0.26 | 10 | 10 | 10 | 10 | 10 | 10 | 10 | 0.8 | 0.8 | 0.7 |
| | 26 | 0.46 | 0.26 | 9 | 8 | 10 | 9 | 8 | 9 | 9 | 4.3 | 1.9 | 2.8 |
| | 27 | 0.46 | 0.24 | 7 | 7 | 7 | 7 | 6 | 7 | 7 | 4.3 | 3.3 | 3.0 |
| | 28 | 0.45 | 0.25 | 99 | 9 | 10 | 9 | 6 | 7 | 7 | 4.5 | 3.3 | 3.3 |
| | 29 | 0.42 | 0.25 | 10 | 16 | 10 | 9 | 7 | 7 | 7 | 2.3 | 1.5 | 1.5 |
| | 30 | 0.43 | 0.24 | 10 | 10 | 10 | 10 | 6 | 6 | 6 | 4.8 | 4.2 | 4.0 |
| | 31 | 0.45 | 0.23 | 9 | 9 | 10 | 10 | 9 | 10 | 9 | 2.3 | 1.8 | 2.6 |
| | 32 | 0.43 | 0.25 | 7 | 10 | 10 | 10 | 9 | 10 | 8 | 1.0 | 1.7 | 3.3 |
| | 33 | 0.45 | 0.23 | 7 | 10 | 10 | 9 | 8 | 8 | 7 | 3.5 | 3.5 | 4.8 |
| | 34 | 0.19 | 0.15 | 8 | 10 | 10 | 10 | 10 | 10 | 10 | 1.9 | 0.8 | 0.8 |
| | 35 | 0.19 | 0.13 | 8 | 10 | 10 | 9 | 9 | 9 | 8 | 2.9 | 1.7 | 1.9 |
| | 36 | 0.35 | 0.15 | 8 | 10 | 10 | 9 | 10 | 9 | 9 | 1.5 | 0.8 | 0.8 |
| | 37 | 0.41 | 0.19 | 8 | 10 | 10 | 9 | 9 | 8 | 9 | 1.7 | 1.9 | 1.9 |
| | 38 | 0.44 | 0.23 | 8 | 9 | 8 | 7 | 8 | 7 | 7 | 2.5 | 3.1 | 3.5 |
| | 39 | 0.42 | 0.26 | 9 | 9 | 10 | 9 | 8 | 9 | 8 | 3.1 | 2.9 | 2.5 |
| | 40 | 0.42 | 0.25 | 10 | 10 | 10 | 9 | 9 | 9 | 8 | 3.2 | 2.2 | 2.6 |

| | | Properties of polyester film | | | | | | | | |
|---|---|---|---|---|---|---|---|---|---|---|
| | | Covering properties (Current value, mA) Thermal lamination temperature | | | Transparency L value of part printed in black Thermal lamination temperature | | | Taste and flavor retention properties | Film making properties | Processability |
| | | 190° C. | 200° C. | 220° C. | 190° C. | 200° C. | 220° C. | | | |
| Example | 22 | 5.6 | 4.9 | 4.3 | 18.8 | 18.7 | 17.8 | ◎ | ○ | ○ |
| | 22 | 3.9 | 2.2 | 2.6 | 19.2 | 17.5 | 17.8 | ◎ | ○ | ○ |
| | 23 | 1.2 | 1.3 | 1.3 | 17.1 | 17.4 | 17.5 | ◎ | ○ | ○ |
| | 24 | 3.6 | 3.0 | 2.8 | 18.2 | 17.8 | 17.2 | ◎ | ○ | ○ |
| | 25 | 1.3 | 1.3 | 1.2 | 17.8 | 17.9 | 17.8 | ◎ | ○ | ○ |
| | 26 | 4.9 | 2.9 | 3.8 | 17.7 | 17.1 | 17.4 | ◎ | ○ | ○ |
| | 27 | 4.8 | 3.8 | 3.5 | 19.9 | 18.9 | 18.3 | ◎ | ○ | ○ |
| | 28 | 4.9 | 3.8 | 3.8 | 20.5 | 19.2 | 19.2 | ◎ | ○ | ○ |
| | 29 | 2.8 | 2.0 | 2.0 | 20.2 | 19.5 | 19.6 | ◎ | ○ | ○ |
| | 30 | 4.9 | 4.7 | 4.5 | 20.4 | 19.8 | 19.6 | ◎ | ○ | ○ |
| | 31 | 2.8 | 2.3 | 3.1 | 18.8 | 18.7 | 18.8 | ◎ | ○ | ○ |
| | 32 | 1.5 | 2.2 | 3.8 | 18.9 | 19.8 | 20.2 | ○ | ○ | ○ |
| | 33 | 4.0 | 4.0 | 4.9 | 19.5 | 19.5 | 21.1 | Δ | ○ | ○ |
| | 34 | 2.1 | 1.3 | 1.3 | 18.8 | 17.2 | 17.3 | ◎ | Δ | Δ |
| | 35 | 2.1 | 1.9 | 2.0 | 18.3 | 19.8 | 20.2 | ◎ | Δ | Δ |
| | 36 | 1.9 | 1.1 | 1.1 | 18.4 | 19.6 | 20.0 | ◎ | ○ | ○ |
| | 37 | 1.9 | 2.1 | 2.2 | 24.8 | 23.5 | 23.2 | ◎ | ○ | ○ |
| | 38 | 3.0 | 3.4 | 3.8 | 29.8 | 28.5 | 29.2 | ◎ | ○ | ○ |
| | 39 | 3.7 | 3.3 | 3.0 | 19.2 | 18.2 | 17.9 | ◎ | ○ | ○ |
| | 40 | 3.5 | 3.6 | 3.3 | 18.6 | 17.9 | 17.5 | ◎ | ○ | ○ |

TABLE 7

| | | Polyester Type | | | | Difference in melt viscosity | Layer structure | | Sheet forming step | |
|---|---|---|---|---|---|---|---|---|---|---|
| | | A | B b1 | B b2 | Mass ratio (b1/b2) | Mass ratio (A/B) | extrusion temperature (Pa·s) | Number of constituent layers | Layer position of low-molecular weight polymer-containing layer | Extrusion temperature (°C.) | Retention time (min) |
| Example | 41 | A-1 | B-4 | B-1 | 40/60 | 80/40 | 18/10 | 1 | — | 275 | 8 |
| | 42 | A-1 | B-4 | B-1 | 20/80 | 80/40 | 18/10 | 1 | — | 275 | 8 |
| | 43 | A-1 | B-4 | B-1 | 50/50 | 60/40 | 18/10 | 1 | — | 275 | 8 |
| Comparative Example | 1 | A-1 | B-1 | — | 100/0 | 85/15 | 10 | 1 | — | 275 | 8 |
| | 2 | A-1 | B-1 | — | 100/0 | 35/25 | 10 | 1 | — | 275 | 8 |
| | 3 | A-1 | B-1 | — | 100/0 | 50/50 | 10 | 1 | — | 275 | 8 |
| | 4 | A-1 | B-1 | — | 180/0 | 40/60 | 10 | 1 | — | 275 | 8 |
| | 5 | A-1 | B-1 | — | 100/2 | 35/65 | 10 | 1 | — | 275 | 8 |
| | 6 | A-1 | B-1 | — | 108/0 | 30/10 | 10 | 1 | — | 275 | 8 |
| | 7 | A-1 | B-1 | — | 102/0 | 90/40 | 10 | 1 | — | 2.25 | 8 |
| | 8 | A-1 | B-1 | — | 100/0 | 50/40 | 10 | 1 | — | 275 | 8 |
| | 9 | A-1 | B-1 | — | 100/0 | 50/40 | 10 | 1 | — | 275 | 8 |
| | 10 | A-1 | B-1 | — | 100/0 | 20/40 | 10 | 1 | — | 275 | 8 |
| | 11 | A-1 | B-1 | — | 100/0 | 60/40 | 10 | 1 | — | 275 | 8 |
| | 12 | A-1 | B-1 | — | 100/0 | 80/40 | 10 | 1 | — | 275 | 8 |
| | 13 | A-1 | B-1 | — | 100/0 | 80/40 | 10 | 1 | — | 275 | 8 |
| | 14 | A-1 | B-1 | — | 100/0 | 50/40 | 10 | 1 | — | 225 | 8 |
| | 15 | A-1 | B-1 | — | 100/0 | 60/40 | 10 | 1 | — | 275 | 8 |
| | 16 | A-1 | B-1 | — | 100/0 | 80/40 | 10 | 1 | — | 275 | 8 |
| | 17 | A-1 | B-1 | — | 100/0 | 55/45 | 10 | 1 | — | 225 | 8 |

| | | Stretching step | | | | | | | | | | |
|---|---|---|---|---|---|---|---|---|---|---|---|---|
| | | MD stretching | | | | | | | TD stretching | | | |
| | | Stretching condition in each stage | | | | | | | | | | |
| | | | First stage | Second stage | Third stage | | | | | | | |
| | | Temperature (°C.) | (MD1) Magnification (X1) | (MD2) Magnification (X2) | (MD3) Magnification (X3) | Magnification ratio X2/X1 | Magnification ratio X3/X2 | MD stretching Magnification (X) | Temperature (°C.) | TD stretching Magnification (Y) | Stretching Magnification ratio (X/Y) | Area magnification (X × Y) |
| Example | 41 | 70 | 1.15 | 3.00 | — | 2.61 | — | 3.45 | 85 | 3.70 | 0.93 | 12.77 |
| | 42 | 70 | 1.15 | 3.00 | — | 2.81 | — | 3.45 | 85 | 3.70 | 0.93 | 12.77 |
| | 43 | 70 | 1.15 | 2.90 | — | 2.62 | — | 3.34 | 85 | 3.60 | 0.93 | 12.01 |
| Comparative Example | 1 | 70 | 1.15 | 3.00 | — | 2.61 | — | 3 45 | 85 | 3.70 | 0.93 | 12.77 |
| | 2 | 70 | 1.15 | 3.00 | — | 2.81 | — | 3.45 | 85 | 3.70 | 0.93 | 12.77 |
| | 3 | 70 | 1.15 | 3.20 | — | 2.78 | — | 3.88 | 85 | 3.55 | 1.04 | 13.06 |
| | 4 | 70 | 1.25 | 2.80 | — | 2.24 | — | 3.50 | 85 | 3.60 | 0.97 | 12.60 |
| | 5 | 80 | 1.15 | 3.00 | — | 2.61 | — | 3.45 | 85 | 3.70 | 0.93 | 12.77 |
| | 6 | 85 | 1.15 | 3.00 | — | 2.81 | — | 3.40 | 85 | 3.70 | 0.93 | 12.77 |
| | 7 | 70 | 1.20 | 2.50 | — | 2.17 | — | 2.88 | 85 | 4.20 | 0.68 | 12.08 |
| | 8 | 70 | 1.20 | 2.80 | — | 2.42 | — | 3.48 | 85 | 4.70 | 0.74 | 18.36 |
| | 9 | 70 | 1.20 | 2.60 | — | 2.08 | — | 3.00 | 85 | 3.80 | 0.78 | 11.40 |
| | 10 | 110 | 3.39 | — | — | — | — | 3.39 | 80 | 4.25 | 0.80 | 14.41 |
| | 11 | 70 | 3.45 | — | — | — | — | 3.45 | 85 | 3.70 | 0.57 | 12.77 |
| | 12 | 70 | 1.15 | 3.80 | — | 3.30 | — | 4.37 | 85 | 3.80 | 1.18 | 18.61 |
| | 13 | 70 | 1.20 | 3.00 | — | 2.60 | — | 3.60 | 85 | 3.00 | 1.20 | 10.90 |
| | 14 | 70 | 1.15 | 3.80 | — | 3.13 | — | 4.14 | 85 | 3.20 | 1.29 | 13.25 |
| | 15 | 70 | 1.30 | 2.40 | — | 1.85 | — | 3.12 | 85 | 3.50 | 0.86 | 10.92 |
| | 16 | 70 | 1.50 | 2.60 | — | 1.73 | — | 3.90 | 85 | 4.20 | 0.93 | 16.38 |
| | 17 | 70 | 3.46 | — | — | — | — | 3.46 | 85 | 3.7 | 0.93 | 12.77 |

TABLE 8

| | | Thermal fixation treatment step Temperature (° C.) | Heat relaxation treatment step Temperature (° C.) | Properties of polyester film | | | | | |
|---|---|---|---|---|---|---|---|---|---|
| | | | | Thickness | | Crystallization index (J/g) | Melting point (° C.) | Tc (° C.) | Tcc (° C.) |
| | | | | Average (μm) | Thickness variation (%) | | | | |
| Example | 41 | 160 | 160 | 12.15 | 7.2 | 40 | 220/242 | 73 | 164 |
| | 42 | 160 | 160 | 12.18 | 8.1 | 40 | 220/248 | 76 | 164 |
| | 43 | 160 | 160 | 11.93 | 8.5 | 40 | 220/238 | 73 | 185 |
| Comparative Example | 1 | 160 | 180 | 11.62 | 7.3 | 65 | 215/246 | 73 | 152 |
| | 2 | 160 | 150 | 12.31 | 5.2 | 60 | 217/248 | 76 | 183 |
| | 3 | 160 | 160 | 11.55 | 3.5 | 34 | 220/250 | 74 | 181 |
| | 4 | 160 | 180 | 12.08 | 3.6 | 31 | 220/250 | 72 | 159 |
| | 5 | 160 | 160 | 12.32 | 3.2 | 28 | 221/253 | 72 | 167 |
| | 6 | 160 | 180 | 12.52 | 4.2 | 25 | 223/255 | 76 | 167 |
| | 7 | 160 | 160 | 12.02 | 9.4 | 43 | 220/250 | 71 | 170 |
| | 8 | 160 | 160 | 11.95 | 9.6 | 42 | 220/250 | 72 | 184 |
| | 9 | 160 | 180 | 12.35 | 12.2 | 44 | 220/250 | 69 | 172 |
| | 10 | 167 | 167 | 11.64 | 4.8 | 28 | 220/250 | 101 | 144 |
| | 11 | 160 | 180 | 12.08 | 10.4 | 26 | 220/250 | 103 | 147 |
| | 12 | 160 | 150 | 11.89 | 4.3 | 35 | 220/250 | 91 | 155 |
| | 13 | 160 | 180 | 12.21 | 14.2 | 41 | 220/250 | 80 | 167 |
| | 14 | 160 | 160 | 12.15 | 4.3 | 34 | 220/250 | 90 | 157 |
| | 15 | 160 | 160 | 11.98 | 11.5 | 45 | 220/250 | 55 | 178 |
| | 16 | 160 | 160 | 12.00 | 2.1 | 45 | 220/250 | 65 | 178 |
| | 17 | 160 | 160 | 12.21 | 10.3 | 20 | 220/250 | 72 | 185 |

| | | Properties of polyester film Dry heat shrinkage rate (%) | | | | | | | | |
|---|---|---|---|---|---|---|---|---|---|---|
| | | 160° C. × 30 min | | | | | 200° C. × 15 min | | | |
| | | MD | 45° | TD | 135° | Maximum − minimum | MD | 45° | TD | 135° | Maximum − minimum |
| Example | 41 | 15.9 | 15.7 | 15.0 | 14.3 | 1.6 | 30.5 | 30.1 | 28.3 | 30.0 | 2.2 |
| | 42 | 35.8 | 15.2 | 15.1 | 14.8 | 1.0 | 30.1 | 29.9 | 28.3 | 30.0 | 3.8 |
| | 43 | 15.5 | 15.0 | 13.6 | 14.9 | 1.9 | 30.7 | 30.2 | 29.2 | 29.8 | 1.5 |
| Comparative Example | 1 | 15.5 | 15.1 | 14.0 | 14.8 | 1.5 | 25.4 | 24.8 | 24.6 | 25.0 | 0.8 |
| | 2 | 37.0 | 15.0 | 13.5 | 15.5 | 3.5 | 31.5 | 29.2 | 28.8 | 28.9 | 2.7 |
| | 3 | 15.8 | 15.1 | 13.8 | 14.4 | 2.0 | 27.8 | 26.3 | 25.3 | 26.6 | 2.5 |
| | 4 | 15.2 | 14.6 | 14.0 | 14.8 | 1.2 | 26.8 | 25.0 | 24.8 | 25.4 | 2.0 |
| | 5 | 35.8 | 13.3 | 13.3 | 15.0 | 2.5 | 22.9 | 21.5 | 20.8 | 21.8 | 2.1 |
| | 6 | 15.6 | 13.5 | 12.5 | 13.2 | 3.1 | 20.8 | 19.4 | 18.9 | 18.8 | 1.9 |
| | 7 | 11.4 | 15.0 | 19.2 | 15.3 | 7.8 | 21.0 | 27.3 | 35.8 | 26.9 | 14.5 |
| | 8 | 15.6 | 18.2 | 21.3 | 18.8 | 6.3 | 30.2 | 35.3 | 40.2 | 36.2 | 10.0 |
| | 9 | 12.0 | 13.3 | 17.2 | 13.8 | 5.2 | 22.6 | 24.6 | 31.3 | 25.0 | 8.7 |
| | 10 | 32.5 | 18.0 | 14.8 | 19.3 | 6.8 | 29.5 | 38.8 | 37.8 | 33.2 | 10.3 |
| | 11 | 14.8 | 14.2 | 13.9 | 14.6 | 0.9 | 26.3 | 25.2 | 24.6 | 25.4 | 1.7 |
| | 12 | 24.8 | 18.2 | 14.8 | 17.9 | 10.0 | 39.3 | 36.8 | 28.2 | 35.3 | 11.1 |
| | 13 | 18.5 | 14.5 | 11.2 | 14.3 | 5.3 | 28.4 | 24.3 | 20.2 | 23.6 | 8.2 |
| | 14 | 23.7 | 18.0 | 12.8 | 18.4 | 10.9 | 42.3 | 35.4 | 22.3 | 33.9 | 20.0 |
| | 15 | 13.3 | 13.0 | 12.8 | 12.5 | 0.8 | 24.1 | 22.9 | 22.4 | 23.0 | 1.7 |
| | 16 | 22.3 | 19.2 | 18.2 | 18.8 | 4.1 | 40.3 | 37.2 | 35.1 | 37.0 | 5.2 |
| | 17 | 17 | 16.8 | 16.5 | 17.4 | 0.9 | 22.9 | 22.4 | 20.9 | 24.5 | 3.6 |

TABLE 9

Properties of polyester film

| | | Slip properties Dynamic friction coefficient | | Adhesiveness (number of test pieces having a peeling strength of 2.9 N or more) | | | | | | | Can-making properties (Current value, mA) Thermal lamination temperature | | |
|---|---|---|---|---|---|---|---|---|---|---|---|---|---|
| | | | | After processing Thermal lamination temperature | | | | After preservation test Thermal lamination temperature | | | | | |
| | | Before thermal lamination | After amorphous treatment | 180° C. | 190° C. | 200° C. | 220° C. | 190° C. | 200° C. | 220° C. | 190° C. | 200° C. | 220° C. |
| Example | 41 | 0.43 | 0.25 | 8 | 8 | 8 | 8 | 8 | 8 | 7 | 3.9 | 3.8 | 3.8 |
| | 42 | 0.42 | 0.25 | 7 | 7 | 8 | 7 | 7 | 5 | 6 | 4.4 | 4.2 | 4.3 |
| | 43 | 0.43 | 0.25 | 10 | 10 | 10 | 9 | 9 | 10 | 9 | 3.2 | 2.9 | 2.1 |
| Comparative Example | 1 | 0.43 | 0.25 | 7 | 10 | 10 | 9 | 4 | 4 | 2 | 1.8 | 2.1 | 4.2 |
| | 2 | 0.42 | 0.25 | 7 | 10 | 10 | 10 | 8 | 8 | 8 | 2.8 | 2.5 | 3.2 |
| | 3 | 0.43 | 0.25 | 7 | 10 | 10 | 10 | 9 | 10 | 9 | 1.8 | 1.1 | 1.5 |
| | 4 | 0.45 | 0.26 | 7 | 10 | 10 | 10 | 9 | 10 | 10 | 2.0 | 1.0 | 0.8 |
| | 5 | 0.46 | 0.24 | 6 | 8 | 8 | 10 | 8 | 8 | 10 | 4.3 | 3.8 | 1.5 |
| | 6 | 0.46 | 0.24 | 2 | 3 | 6 | 6 | — | 3 | 3 | 7.2 | 6.8 | 4.8 |
| | 7 | 0.45 | 0.24 | 4 | 6 | 6 | 4 | 5 | 4 | — | 5.2 | 4.3 | 6.8 |
| | 8 | 0.42 | Poor | 1 | 2 | 2 | 3 | — | — | — | 6.7 | 6.5 | 5.9 |
| | 9 | 0.42 | Poor | 1 | 2 | 4 | 2 | — | — | — | 7.3 | 6.5 | 7.7 |
| | 10 | 0.44 | Poor | 2 | 6 | 4 | 4 | 4 | 3 | 3 | 6.2 | 6.9 | 6.8 |
| | 11 | 0.43 | 0.26 | 1 | 4 | 10 | 7 | — | 10 | 7 | 5.2 | 2.8 | 5.2 |
| | 12 | 0.43 | Poor | 3 | 6 | 5 | 3 | 6 | — | — | 4.1 | 5.9 | 6.3 |
| | 13 | 0.45 | Poor | 2 | 3 | 4 | 3 | — | — | — | 6.3 | 5.8 | 6.0 |
| | 14 | 0.45 | Poor | 3 | 6 | 5 | 1 | 6 | — | — | 4.2 | 5.2 | 6.9 |
| | 15 | 0.46 | 0.24 | 1 | 3 | 9 | 7 | — | 9 | 7 | 5.5 | 3.2 | 4.3 |
| | 16 | 0.44 | 0.23 | 4 | 8 | 7 | 4 | 7 | 6 | — | 3.3 | 2.3 | 6.0 |
| | 17 | 0.43 | 0.25 | 1 | 4 | 10 | 10 | — | 10 | 10 | 6.9 | 6.9 | 6.9 |

Properties of polyester film

| | | Covering properties (Current value, mA) Thermal lamination temperature | | | Transparency L value of part printed in black Thermal lamination temperature | | | Taste and flavor retention properties | Film making properties | Processability |
|---|---|---|---|---|---|---|---|---|---|---|
| | | 190° C. | 200° C. | 220° C. | 190° C. | 200° C. | 220° C. | | | |
| Example | 41 | 4.1 | 4.5 | 4.3 | 20.5 | 21.2 | 22.0 | ⊚ | ○ | ○ |
| | 42 | 4.9 | 4.8 | 4.8 | 25.5 | 24.0 | 28.3 | ⊚ | ○ | ○ |
| | 43 | 3.7 | 3.4 | 3.5 | 18.7 | 17.5 | 18.3 | ⊚ | ○ | ○ |
| Comparative Example | 1 | 9.8 | 9.2 | 9.7 | 30.8 | 32.8 | 42.0 | ⊚ | ○ | ○ |
| | 2 | 8.8 | 7.3 | 8.8 | 32.5 | 30.8 | 39.2 | ⊚ | ○ | ○ |
| | 3 | 7.9 | 7.5 | 8.1 | 38.2 | 30.8 | 30.9 | ○ | ○ | ○ |
| | 4 | 8.8 | 7.8 | 8.5 | 45.5 | 41.4 | 34.5 | ○ | ○ | ○ |
| | 5 | 9.2 | 8.8 | 9.1 | 48.2 | 45.2 | 39.8 | Δ | ○ | ○ |
| | 6 | 9.6 | 8.1 | 8.5 | 41.5 | 38.9 | 34.5 | Δ | ○ | ○ |
| | 7 | 8.2 | 7.3 | 9.8 | 32.4 | 30.1 | 34.8 | ⊚ | ○ | ○ |
| | 8 | 11.7 | 23.5 | 10.9 | 32.6 | 32.0 | 30.7 | ⊚ | ○ | ○ |
| | 9 | 12.3 | 11.5 | 12.7 | 41.8 | 31.8 | 42.8 | ⊚ | ○ | ○ |
| | 10 | 9.2 | 9.9 | 9.8 | 34.5 | 38.0 | 38.3 | Δ | ○ | ○ |
| | 11 | 6.8 | 3.0 | 5.5 | 31.5 | 29.8 | 30.5 | Δ | ○ | ○ |
| | 12 | 9.1 | 10.9 | 11.3 | 30.4 | 32.8 | 35.4 | ⊚ | ○ | ○ |
| | 13 | 11.3 | 10.8 | 11.0 | 32.9 | 30.1 | 30.8 | ⊚ | ○ | ○ |
| | 14 | 6.2 | 7.2 | 8.9 | 33.8 | 34.8 | 36.6 | ○ | ○ | ○ |
| | 15 | 7.5 | 5.2 | 6.3 | 36.6 | 28.4 | 28.6 | ⊚ | ○ | ○ |
| | 16 | 5.3 | 4.3 | 8.0 | 25.6 | 25.1 | 36.7 | ⊚ | ○ | ○ |
| | 17 | 8.8 | 9.0 | 9.5 | 30.6 | 30.9 | 32.5 | x | ○ | ○ |

The polyester film obtained in each of Examples 1 to 43 had a mass ratio between the polyester (A) composed mainly of polybutylene terephthalate and the polyester (B) composed mainly of polyethylene terephthalate, dry heat shrinkage rates in four directions, a difference between the maximum value and the minimum value of dry heat shrinkage rates in four directions, a thickness variation, and a crystallization index in the ranges specified in the present invention, enabling thermal lamination in a wide temperature range, and having excellent adhesiveness to metal plate, excellent can-making properties and excellent transparency after can-making. Further, the polyester film had excellent taste and flavor retention properties, excellent adhesiveness to a metal plate even stored for a long period of time after retort treatment and also excellent covering properties.

In particular, the films in Examples 2, 23, 25 and 29 subjected to MD stretching in 3 stages had improved thickness variation in comparison with the films in Examples 1, 22, 24 and 28 subjected to 2-stage MD stretching, so that the adhesiveness, can-making properties and covering properties were further improved before and after storage.

The film in Example 13 had the most suitable conditions of the stretching magnification ratio and the area magnification for use as an outer surface film, so that the transparency after can-making required for an outer surface film of a metal can was the highest.

The film in Example 6 had the most suitable conditions of the stretching magnification ratio and the area magnification for use as an inner surface film, so that the covering properties in long-term storage after retort treatment required for an inner surface film of a metal can were the highest without increase in faults even in long-term storage after retort treatment.

As shown in comparison of Examples 1, and 34 to 38, in lamination with a metal plate at high temperature, the polyester film had more excellent thermal lamination properties with a metal plate and adhesiveness at later time as the number of constituent layers decreased.

As shown in comparison of Examples 17 to 21, the polyester film obtained in Example 19 was heat-treated at a most suitable temperature, so that the dry heat shrinkage rate in heat treatment at 160° C. for 30 minutes or at 200° C. for 15 minutes was in the most preferable range, resulting in excellent thermal lamination properties with a metal plate and adhesiveness at later time.

For example, as shown in comparison of Examples 8, 26 and 43, the polyester film containing a copolymerized polyethylene terephthalate as polyester (B) had excellent thermal lamination properties in a low temperature range and held high adhesiveness even in the case where the thickness variation was large.

In contrast, the films in Comparative Examples 1 and 2 had a proportion of the polyester (A) in the total mass of the polyester (A) and the polyester (B) of more than 70 mass %, so that the covering properties in long-term storage after retort treatment and the transparency after can-making were poor. The film in Comparative Example 1 had also poor adhesiveness in long-term storage after retort treatment.

The films in Comparative Examples 3 to 6 had a proportion of the polyester (B) of more than 45 mass %, so that the transparency after can-making was low, and the covering properties in long-term storage after retort treatment were poor. The film in Comparative Example 6 had poor adhesiveness between the film and a metal plate in lamination with a metal plate at low temperature.

The film in Comparative Example 11 subjected to one-stage MD stretching had a thickness variation exceeding the range specified in the present invention, so that the adhesiveness was poor in thermal lamination at low temperature, and the can-making properties, the covering properties and the transparency were poor in thermal lamination not only at low temperature but also at high temperature.

The films in Comparative Examples 7, 10 and 14 had a stretching magnification ratio not satisfying the range specified in the present invention, so that the dry heat shrinkage rate exceeded the range specified in the present invention, and the difference between the maximum value and the minimum value of the dry heat shrinkage rate was not able to satisfy the range specified in the present invention. As a result, in the case of high thermal lamination temperature, the films were poor in adhesiveness, can-making properties, covering properties, and transparency after can-making.

The films in Comparative Examples 8 to 9 and 12 to 13, not only the stretching magnification ratio but also the area magnification did not satisfy the range specified in the present invention, so that not only the difference between the maximum value and the minimum value of the dry heat shrinkage rate but also the dry heat shrinkage rates in four directions were not able to satisfy the range specified in the present invention in some cases. As a result, the films were poor in adhesiveness, can-making properties, covering properties, and transparency after can-making.

The film in Comparative Example 15 had an area magnification less than the range specified in the present invention, and a thickness variation more than the range specified in the present invention, so that in thermal lamination at low temperature, the film was poor in adhesiveness, can-making properties, covering properties, and transparency after can-making.

The film in Comparative Example 16 had an area magnification more than the range specified in the present invention, so that the difference between the maximum value and the minimum value of the dry heat shrinkage rate was more than the range specified in the present invention. As a result, in thermal lamination at high temperature, the film was poor in adhesiveness, can-making properties, covering properties, and transparency after can-making.

The film obtained by MD stretching performed in one stage in Comparative Examples 17 had a thickness variation out of the range specified in the present invention, so that the adhesiveness was poor in thermal lamination at low temperature, can-making properties and covering properties were poor even in thermal lamination at high temperature as well as at low temperature, and transparency was poor. Further, the film had a crystallization index not satisfying the range specified in the present invention, so that the taste and flavor retention properties were poor.

The film in Comparative Examples 8 to 10, and 12 to 14 had a poor adhesiveness to a metal plate after thermal lamination at 200° C., and peeled off the metal plate due to shrinkage in amorphous treatment, so that evaluation on slip properties after amorphous treatment was unavailable.

The invention claimed is:
1. A polyester film having a layer (L1) and a layer (L2),
wherein the layer (L1) comprises a polyester (A) composed mainly of polybutylene terephthalate, a polyester (B) composed mainly of polyethylene terephthalate, and a low-molecular weight polymer having a weight average molecular weight (Mw) of 30,000 or less, and
wherein the layer (L2) comprises the polyester (A) and the polyester (B), does not comprise the low-molecular weight polymer,
wherein a mass ratio (A/B) between the polyesters (A) and (B) in the polyester film is 70/30 to 55/45,
wherein the first dry heat shrinkage rate of the film through heat treatment of the film at 200° C. for 15 minutes is 35% or less in any of four directions on a film surface consisting of a 0° direction as an arbitrary direction, and a 45° direction, a 90° direction and a 135° direction clockwise from the 0° direction, and a difference between a maximum value and a minimum value of these dry heat shrinkage rates is 5% or less,
wherein a thickness variation calculated from the following equation in the four directions is 10% or less:

$$\text{Thickness variation (\%)} = (T_{max} - T_{min})/T_{ave} \times 100$$

$T_{max}$: maximum thickness in four directions of polyester film $T_{min}$: minimum thickness in four directions of polyester film $T_{ave}$: average thickness in four directions of polyester film, and wherein a crystallization index shown in DSC measurement is 25 to 55 J/g.

2. The polyester film according to claim 1, wherein the polyester film has melting points in the range of 200 to 223° C. and in the range of 225 to 256° C.

3. The polyester film according to claim 1, wherein the first dry heat shrinkage rate through heat treatment at 200° C. for 15 minutes is 5% or more in any of four directions on a film surface consisting of a 0° direction as an arbitrary direction, and a 45° direction, a 90° direction and a 135° direction clockwise from the 0° direction.

4. The polyester film according to claim 1, wherein the film has the second dry heat shrinkage rate through heat treatment at 160° C. for 30 minutes of 3 to 20% in any of four directions on a film surface consisting of a 0° direction as an arbitrary direction, and a 45° direction, a 90° direction and a 135° direction clockwise from the 0° direction.

5. A method for producing the polyester film of claim 1, comprising stretching an unstretched sheet in a flow direction of the sheet (MD stretching) and then stretching the same in a width direction (TD stretching),
wherein the MD stretching is performed in two or more stages such that the MD stretching magnification (X) represented by a product of stretching magnifications in the respective stages in the MD stretching and the TD stretching magnification (Y) satisfy the following conditions:
a stretching magnification ratio (X/Y) of 0.82 to 1.10, and an area magnification (XXY) of 12.00 to 16.00.

6. The method for producing a polyester film according to claim 5, wherein in the MD stretching, the stretching magnification $(X_{n+1})$ in a (n+1)-th stage is higher than the stretching magnification $(X_n)$ in an n-th stage.

7. The method for producing a polyester film according to claim 5, wherein at the temperature during extrusion into an unstretched sheet, the polyester (A) and the polyester (B) for use have a difference in melt viscosity of 65 Pa·s or less.

8. A polyester film for lamination on a metal plate, comprising the polyester film of claim 1.

9. A polyester film for lamination on a metal can, comprising the polyester film of claim 1.

10. The polyester film for lamination on a metal can according to claim 9, wherein the lamination is on an inner surface of the metal can.

11. The polyester film for lamination on a metal can according to claim 9, wherein the lamination is on an outer surface of the metal can.

12. A laminated metal plate comprising the polyester film for lamination on a metal plate of claim 8 laminated on the metal plate.

13. A metal container obtained by forming the laminated metal plate of claim 12.

14. The polyester film according to claim 1, wherein the polyolefin comprises polyethylene or polypropylene.

* * * * *